(12) United States Patent
Dai

(10) Patent No.: US 12,228,239 B2
(45) Date of Patent: Feb. 18, 2025

(54) SUPPORT BASE, ELECTRONIC DEVICE AND SELFIE DEVICE

(71) Applicant: Shenzhen intelliARK Technology Co., Ltd, Shenzhen (CN)

(72) Inventor: Yuncheng Dai, Shenzhen (CN)

( * ) Notice: Subject to any disclaimer, the term of this patent is extended or adjusted under 35 U.S.C. 154(b) by 0 days.

(21) Appl. No.: 17/721,370

(22) Filed: Apr. 15, 2022

(65) Prior Publication Data
US 2022/0252214 A1 Aug. 11, 2022

Related U.S. Application Data

(63) Continuation of application No. PCT/CN2020/140024, filed on Dec. 28, 2020.

(51) Int. Cl.
*F16M 11/38* (2006.01)
*F16M 11/28* (2006.01)
*F16M 13/00* (2006.01)

(52) U.S. Cl.
CPC .............. *F16M 11/38* (2013.01); *F16M 11/28* (2013.01); *F16M 13/005* (2013.01)

(58) Field of Classification Search
CPC ...... F16M 11/26; F16M 11/28; F16M 13/005; F16M 11/38; F16M 11/2085; F16M 11/425; F16M 13/00; F16M 13/04; H01Q 1/1235; F16C 11/10; Y10T 403/32057; Y10T 403/32073; G03B 17/561; B60R 2011/0082
USPC ....... 248/452, 307, 308, 688, 685, 686, 461, 248/528–529, 346.3, 286.1, 176.3, 248/346.06; 403/83, 348, 353
See application file for complete search history.

(56) References Cited

U.S. PATENT DOCUMENTS 3,733,042 A * 5/1973 Jungjohann ......... F16C 11/0619
312/328
3,747,884 A * 7/1973 Steisslinger ........... F16M 11/14
248/181.1
(Continued)

FOREIGN PATENT DOCUMENTS

CN 206409419 U 8/2017
CN 207527271 U 6/2018
(Continued)

OTHER PUBLICATIONS

Machine translation for CN207527271; Shenzhen Qingyuan Digital Co.; Jun. 22, 2018 (Year: 2018).*

*Primary Examiner* — Ingrid M Weinhold
(74) *Attorney, Agent, or Firm* — Hemisphere Law, PLLC; Zhigang Ma

(57) ABSTRACT

A support base, an electronic device, and a selfie device are provided. The support base is used for supporting an object, and includes a base in which a storage part is provided, an opening being formed in a side surface of the base, and being communicated with the storage part; and a support mechanism slidably connected to the storage part, the support mechanism being able to slide along the storage part. The storage part is arranged inside the base, and the support mechanism is movably connected to the storage part. During supporting, the support mechanism can extend from the storage part to support the object. During storage, the support mechanism can retract into the storage part and be stored in the base. Therefore, when the support structure is storable, the storage part is arranged in the base, so that dust cannot enter it.

8 Claims, 22 Drawing Sheets

(56) References Cited

U.S. PATENT DOCUMENTS

| | | | | |
|---|---|---|---|---|
| 5,035,464 A * | 7/1991 | Spallholtz | | A47C 7/62 403/115 |
| 5,374,104 A * | 12/1994 | Moore | | B64D 11/00153 248/286.1 |
| 6,536,731 B1 * | 3/2003 | Tegland | | F21V 21/28 211/100 |
| 7,261,266 B2 * | 8/2007 | Satterfield | | B64D 11/00153 297/217.3 |
| 7,624,955 B2 * | 12/2009 | McGill | | F16M 11/041 248/346.06 |
| 8,328,153 B2 * | 12/2012 | Yang | | F16M 11/38 248/370 |
| 8,726,439 B2 * | 5/2014 | Orzeck | | B25F 1/003 7/128 |
| 9,027,486 B1 * | 5/2015 | Berkovitz | | B60N 3/101 248/458 |
| 11,092,279 B2 * | 8/2021 | Chen | | F21V 21/26 |
| D961,653 S * | 8/2022 | Dai | | D16/244 |
| 11,946,591 B2 * | 4/2024 | Huang | | H04R 1/02 |
| 2006/0219857 A1 * | 10/2006 | Satterfield | | B64D 11/00153 248/284.1 |
| 2007/0278366 A1 * | 12/2007 | McGill | | F16M 13/00 248/176.3 |
| 2016/0166056 A1 * | 6/2016 | Le | | F16M 13/005 248/461 |
| 2017/0164719 A1 * | 6/2017 | Wheeler | | A45D 42/10 |
| 2019/0126842 A1 * | 5/2019 | Jackson | | B60N 3/103 |
| 2019/0232885 A1 * | 8/2019 | Yamada | | B60R 11/0252 |
| 2019/0339595 A1 * | 11/2019 | Liu | | F16M 11/2028 |
| 2021/0079931 A1 * | 3/2021 | Hu | | F04D 25/084 |
| 2023/0235848 A1 * | 7/2023 | Huang | | H04R 1/08 248/188.6 |

FOREIGN PATENT DOCUMENTS

| | | |
|---|---|---|
| CN | 110469793 A | 11/2019 |
| CN | 210660666 U | 6/2020 |

* cited by examiner

SUPPORT BASE, ELECTRONIC DEVICE AND SELFIE DEVICE

CROSS-REFERENCE TO RELATED APPLICATIONS

The application is a continuation of International Application No. PCT/CN2020/140024 filed on Dec. 28, 2020, which claims priority of Chinese patent application 202021079057.2, filed on Jun. 11, 2020, under 35 U.S.C. § 371, both applications are incorporated herein by reference in their entireties.

TECHNICAL FIELD

The present disclosure relates to the technical field of support structures, in particular to a support base, an electronic device and a selfie device.

BACKGROUND ART

In order to meet the demand for miniaturization of electronic devices, at present, the prior art discloses a novel folding apparatus, and a fan and desk lamp used therefor, the application number of which is CN 201910759824.X. In the novel folding apparatus, a storage slot is formed in a bottom surface of the base, and a telescopic mechanism may be stored in the storage slot to achieve minimization. In addition, the prior art also discloses a folding apparatus with extension-retraction and storage functions, and a folding fan thereof, the application number of which is CN 201910759811.2. In the folding apparatus with extension-retraction and storage functions, a storage slot is formed in a surface of the base, and the telescopic mechanism may be stored in the storage slot to achieve minimization. However, the storage slots of the two solutions are formed in the surface or bottom of the base, so that it is easily for dust to fall into or adhere to the storage slots, which is difficult to clean.

DETAILED DESCRIPTION OF THE EMBODIMENTS

First Embodiment

Referring to FIG. 1 to FIG. 7, a first embodiment of a support base 100A provided by the present disclosure is illustrated. The support base 100A is used for supporting an object. The object may be a small-size electronic device, such as a fan, a desk lamp, and a speaker, or may be a small-size daily supply, such as a mobile phone or a tablet bracket, a reading bracket, or a mirror. The support base 100A includes a base 10A and a support mechanism. A storage part 60A is arranged in the base 10A; an opening 11 is formed in a side surface of the base 10A; the opening 11 is communicated with the storage part 60A; the support mechanism is movably connected to the storage part 60A; when the support mechanism is moved or rotated, at least part of the support mechanism can extend out of the base 10A from the opening 11 to support the object, and at least part of the support mechanism can retract into the storage part 60A from the opening 11 and be stored in the base 10A.

In specific implementation, the base 10A may be a rectangular or circular base 10A. Of course, it may also be a base 10A in other shapes, as long as the opening 11 may be provided in the side surface of the base 10A. The opening 11 is communicated with the storage part 60A, so that the support mechanism can extend out of or retract into the storage part 60A from the opening 11. There are various methods for connecting the support mechanism to the storage part 60A, such as rotatable connection, rolling connection, or slidable connection. Specifically, the support mechanism may be provided with a roller, so that it may roll on the storage part 60A to extend out of or retract into the storage part 60A. Or, the storage part 60A has an internal thread, and the support mechanism has an external thread. The support mechanism and the storage part are in threaded connection. The support mechanism is rotated to extend out of or retract into the storage part 60A. Or, the support mechanism is provided with a sliding block, and the storage part 60A is provided with a guide rail, so that the support mechanism can slide on the storage part 60A to extend out of or retract into the storage part 60A. By implementation of this embodiment, the storage part 60A is arranged in the base 10A; the support mechanism may move relative to the storage part 60A; the support mechanism can extend out of the base 10A from the storage part 60A to support the object, and retract from the storage part 60A and be stored in the base 10A. Therefore, external dust cannot enter the storage part 60A arranged inside the base 10A, thus solving the problem of dust accumulation; and the appearance is simpler and more regular.

Figure 1:
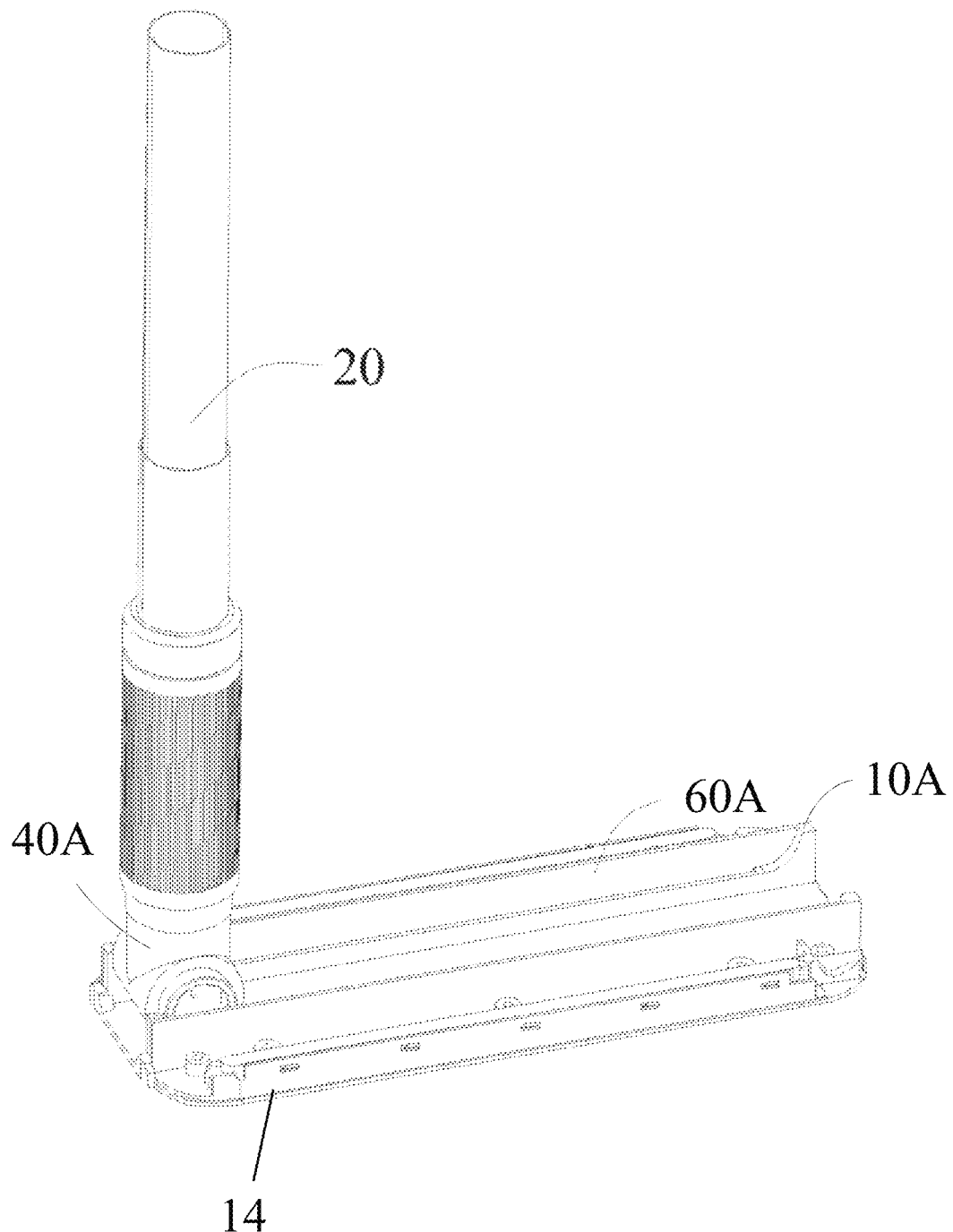
FIG. 1 is a schematic diagram of a support base according to a first embodiment of the present disclosure.
Figure 2:
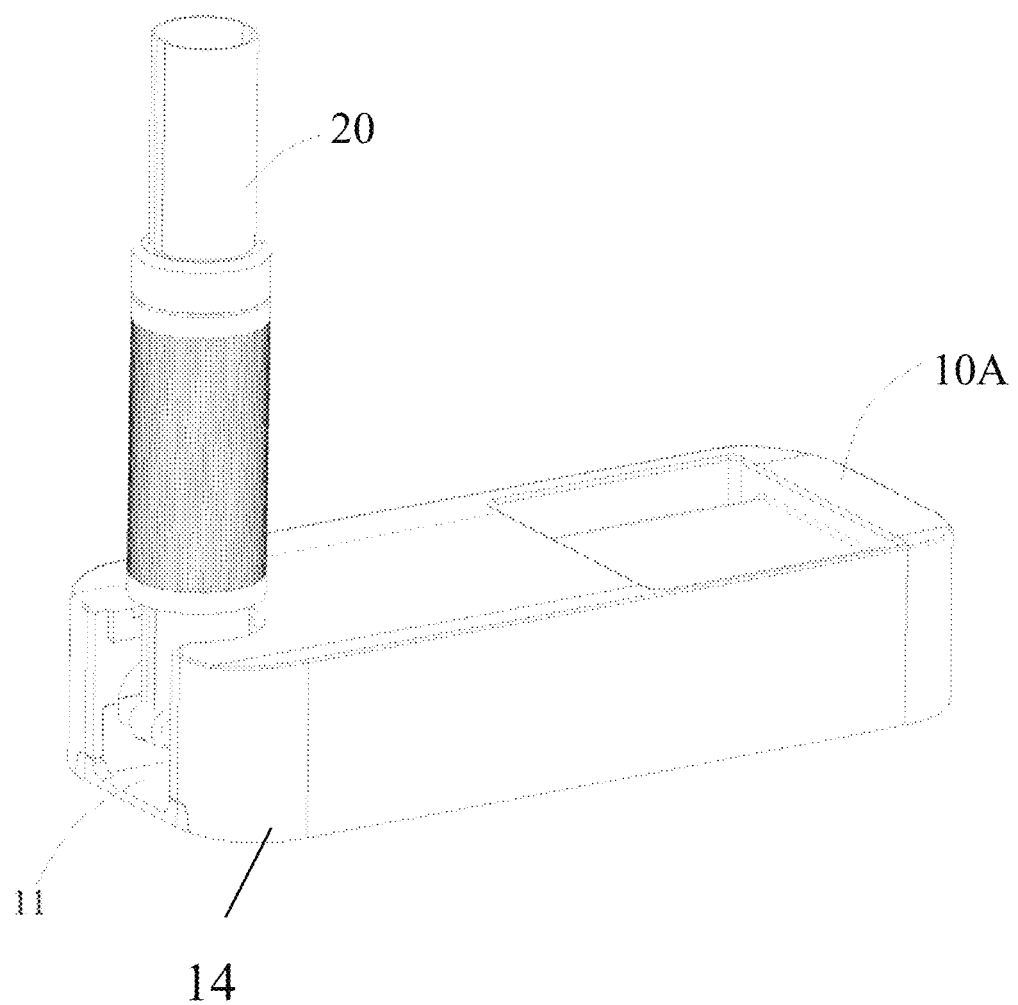
FIG. 2 is a schematic diagram of a support state of a support base according to a first embodiment of the present disclosure.
Figure 3:
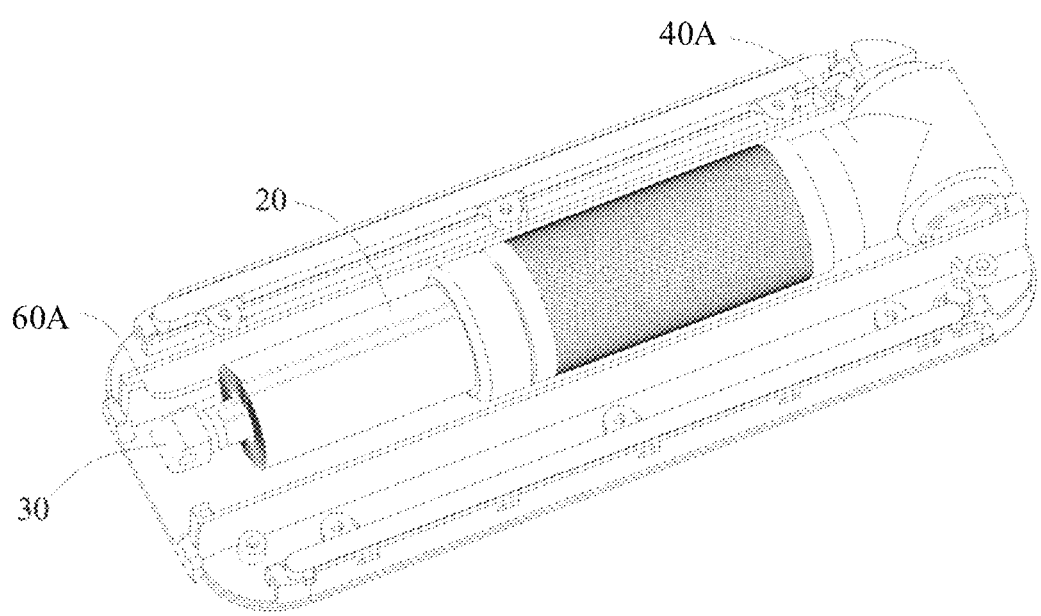
FIG. 3 is a schematic diagram of a storage state of a support base according to a first embodiment of the present disclosure.

Referring to FIG. 1 to FIG. 3, the support mechanism includes a support member 20 and a connector 40A. A top end of the support member 20 is used for supporting the object. The support member 20 is connected with the connector 40A. The connector 40A can rotate relative to the base 10A when the support member 20 extends out of the opening 11. Specifically, the connector 40A, on the one hand, has a function of moving relative to the storage part 60A, and on the other hand, has a function of rotating relative to the base 10A. The connector 40A is movably connected to the storage part 60A, and moves relative to the storage part 60A in a manner of rotating, rolling or sliding. For example, the connector 40A is provided with a roller to achieve rolling. Or, the connector 40A is provided with an internal thread, and the storage part 60A is provided with an external thread, so that the connector is screwed with the storage part 60A to achieve rotation. Or, the connector 40A is provided with a sliding block, and the storage part 60A is provided with a guide rail, so that the sliding block and the sliding rail match with each other to achieve sliding. The connector 40A may rotate relative to the base 10A. For example, the connector 40A may be provided with a rotating shaft or a hose, so that the connector 40A may rotate when it extends out of the opening 11. There are various forms of the connector 40A. In any form, the connector 40A has the function of moving relative to the storage part 60A and the function of rotating relative to the base 10A. Those skilled in the art can set the connector according to an actual need.

Referring to FIG. 3, the support mechanism further includes a hinge member 30. The hinge member 30 is connected with the top end of the support member 20 and is used for being hinged to the object. The object is hinged to the support member 20 through the hinge member 30. Therefore, when the support mechanism is stored into the storage part 60A, the object can rotate relative to the base 10A and be stored on the base 10A. The storage is more integrated, and the volume of a product is smaller.

Figure 19:
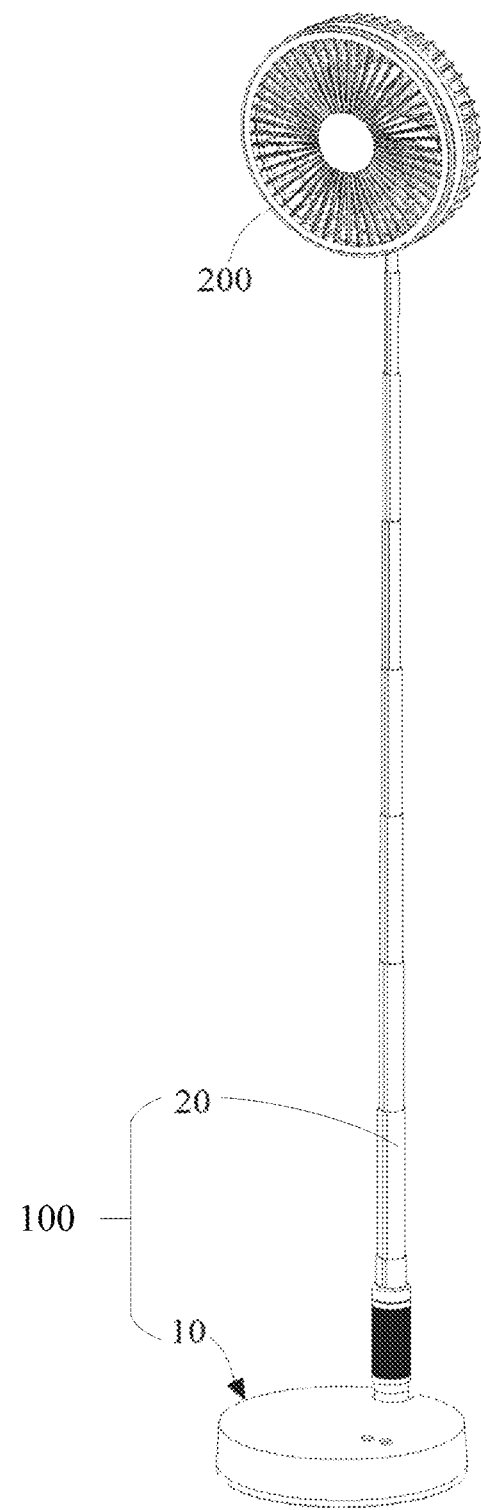
FIG. 19 is a schematic diagram of a support state of a fan according to one embodiment of the present disclosure.
Figure 20:
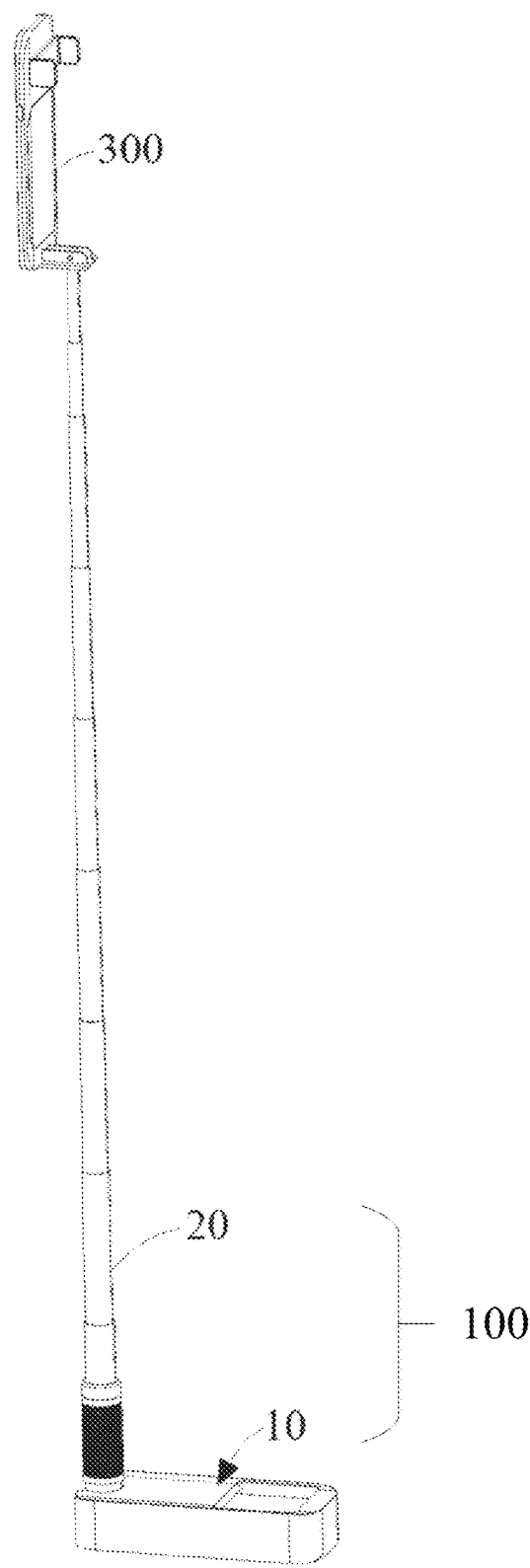
FIG. 20 is a schematic diagram of a support state of a selfie device according to one embodiment of the present disclosure.

Referring to FIG. 19 or FIG. 20, the support member 20 may be a support rod, or a telescopic rod. Spreading of the telescopic rod can adjust the support height of the object. The telescopic rod can achieve self-locking when it is spread, so as to ensure the support strength of the object. Due to the extending and retracting characteristic of the telescopic rod, the support flexibility can be improved. Specifically, an appropriate telescopic rod or support rod can be selected according to an actual need, which is not limited here.

Figure 4:
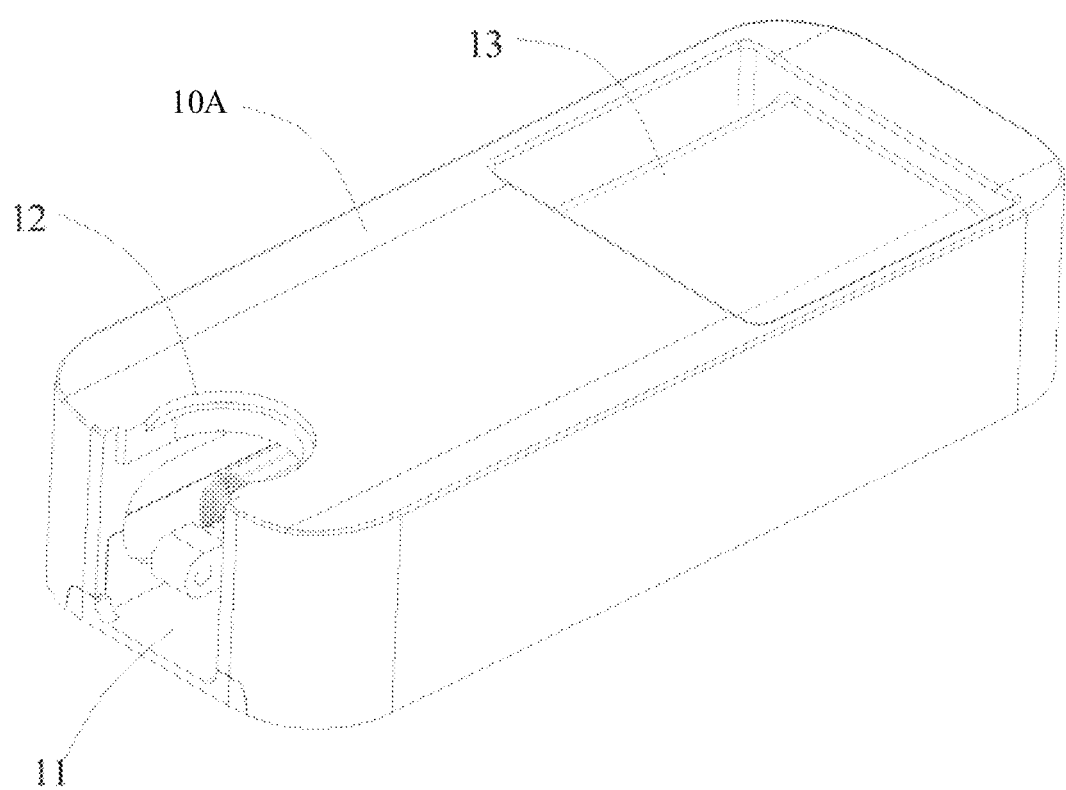
FIG. 4 is a schematic diagram of a base of a support base according to a first embodiment of the present disclosure.

Referring to FIG. 4, a gap 12 is formed in a position where the opening 11 is connected with one surface of the base 10A. One surface of the base 10A may be the upper surface or the lower surface. If the gap 12 is formed in the position where the upper surface of the base 10A and the opening 11 are connected, when the connector 40A extends out of the opening 11, the connector can rotate relative to the base 10A to abut against the gap 12. When the support mechanism is stored in the storage part 60A, the object can rotate relative to the base 10A and partially abut against the gap 12, so as to be stored on the upper surface of the base 10A. Similarly, if the gap 12 is formed in the lower surface of the base 10A, the object may be stored on the lower surface of the base 10A. The gap 12 is a space for enabling the connector 40A and the object to rotate and be accommodated, so that the structure is more compact, and the integration effect is better.

Figure 5:
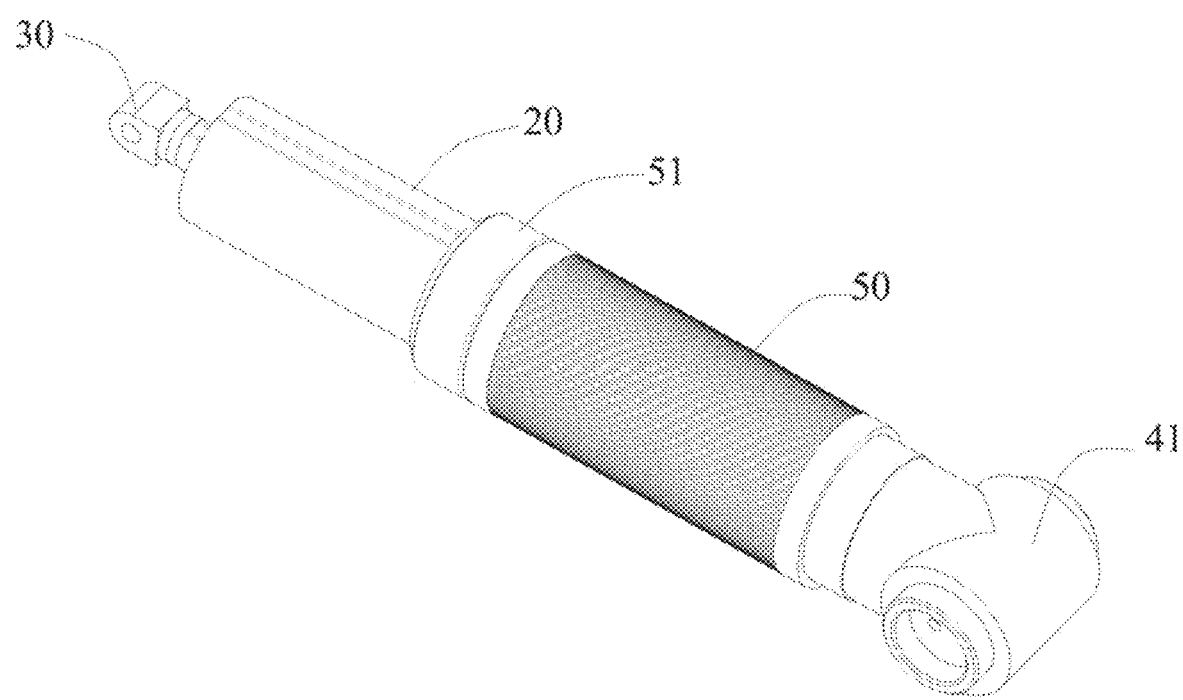
FIG. 5 is a schematic diagram of a support mechanism of a support base according to a first embodiment of the present disclosure.
Figure 6:
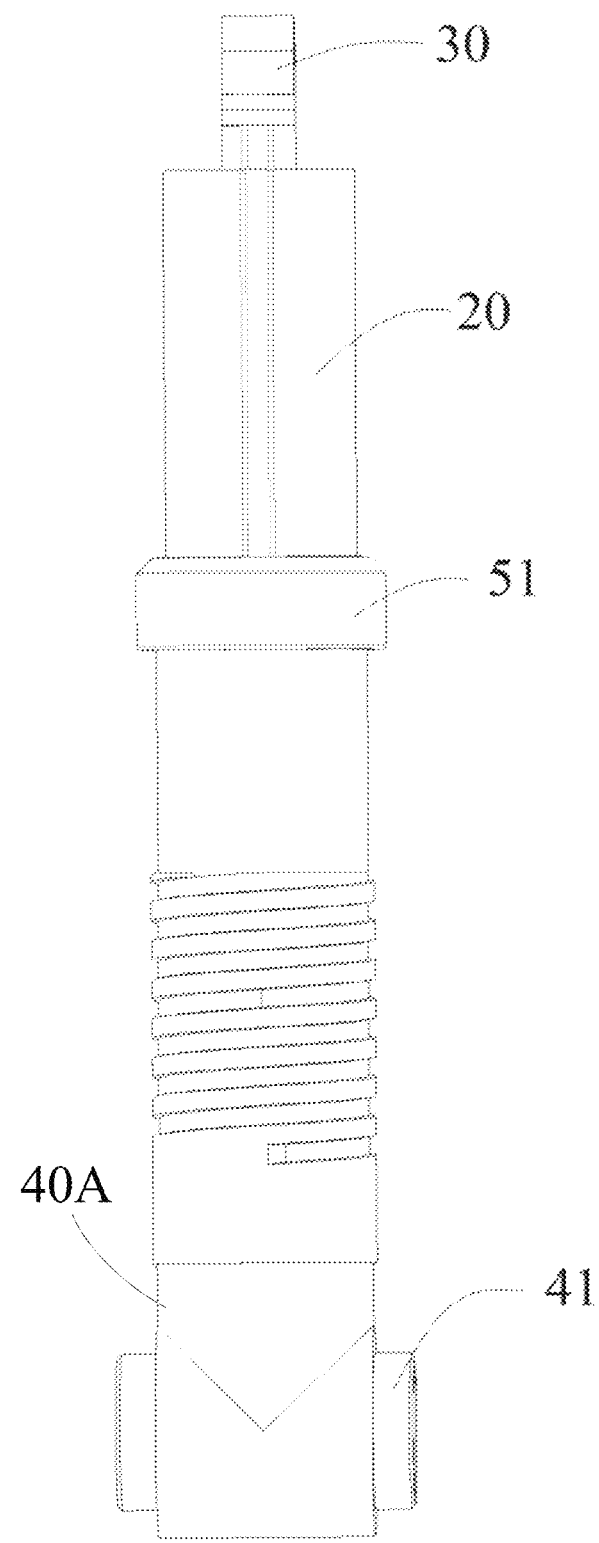
FIG. 6 is a schematic diagram of a connection sleeve of a support base according to a first embodiment of the present disclosure.

Referring to FIG. 5 and FIG. 6, the support mechanism further includes a locking sleeve 50. The locking sleeve 50 is sleeved on the connector 40A. When the connector 40A abuts against the gap 12, the locking sleeve 50 moves (such as rotates or slides) towards the base 10A, and the locking sleeve 50 abuts against the base 10A. Specifically, the locking sleeve 50 is provided with an internal thread, and the connector 40A is provided with an external thread. The locking sleeve 50 and the connector 40A are screwed, so that the locking sleeve 50 is rotated to move along an axis of the connector 40A. When supporting the object, the connector 40A abuts against the gap 12, and the locking sleeve 50 moves (such as rotates or slides) towards the base 10A, so that the locking sleeve 50 moves relative to the connector 40A towards the base 10A until the locking sleeve 50 abuts against the base 10A to fix the connector 40A and the base 10A, which ensures the stability of the support member 20 and prevent the object from shaking. Specifically, the locking sleeve 50 can directly abut against the surface of the base 10A. A flange may be provided on the gap 12, and the locking sleeve 50 abuts against the flange, as long as it is pressed to the base 10A to keep the stability between the connector 40A and the base 10A.

Referring to FIG. 5 and FIG. 6, the support mechanism further includes a limiting ring 51. The limiting ring 51 is sleeved on the connector 40A and is close to one end of the support member 20. Specifically, an end of the connector 40A close to the support member 20 is provided with a clamping block or a clamping slot, and the limiting ring 51 is provided with a matching bayonet. The bayonet matches with the clamping block or the clamping slot to sleeve the limiting ring 51 on the connector 40A. Of course, it can be understood that in addition to a fastened connection manner for sleeving the limiting ring 51 on the connector 40A, a threaded connection manner can also be adopted, which is not limited here. The locking sleeve 50 moves (such as rotates or slides) towards the support member 20 until it abuts against the limiting ring 51, and the limiting ring 51 limits the locking sleeve 50 to prevent the locking sleeve 50 from falling off from the connector 40A.

Figure 7:
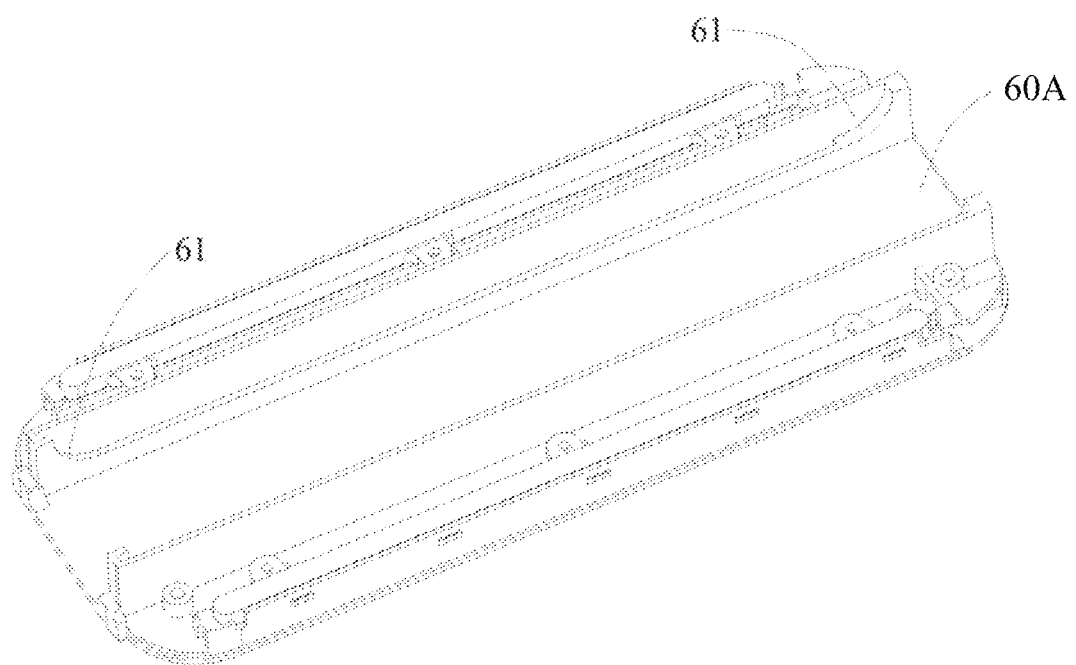
FIG. 7 is a schematic diagram of a storage part of a support base according to a first embodiment of the present disclosure.

Referring to FIGS. 6 and 7, the connector 40A is a connection sleeve. One end of the connection sleeve is sleeved on the support member 20, and the other end of the connection sleeve extends towards two sides to form a sliding part 41. The storage part 60A is a sliding chute, and the sliding part 41 is slidably connected to the sliding chute. Part or all of a circumferential surface of the sliding part 41 is an arc surface. When sliding to the opening 11, the sliding part 41 can rotate relative to the base 10A to enable the connection sleeve to abut against the gap 12. Specifically, the sliding part 41 of the connection sleeve is a cylinder, and the circumferential surface of the cylinder is perpendicular to the connection sleeve. Steps are provided on two opposite side walls of the sliding chute. The circumferential surface at two ends of the cylinder is disposed on the steps of the two sides, so that the sliding part 41 can slide in the sliding chute. Furthermore, since the sliding part 41 is a cylinder, when sliding on the sliding chute to the opening 11, the sliding part 41 can rotates with the circumferential surface of the cylinder, namely, its arc surface, and the connection sleeve can rotatably abut against the gap 12. Of course, it can be understood that a part of the circumferential surface of the sliding part 41 may be an arc surface, as long as the arc surface part is disposed on the sliding chute and can rotate.

Continuing to refer to FIG. 7, two ends of the sliding chute are further provided with limiting arc surfaces 61. The limiting arc surfaces 61 match with the arc surface of the sliding part 41. On the one hand, the limiting arc surfaces 61 are used for limiting the sliding part 41 to prevent the connection sleeve from sliding out of the opening 11. On the other hand, they are set to be arc surfaces to match with the arc surface of the sliding part 41. When the sliding part 41 slides to an end of the sliding chute close to the opening 11, its arc surface abuts against the limiting arc surfaces 61. During rotating, the sliding part 41 can rotate in a manner of being fitted to the limiting arc surfaces 61, so that the rotation is smoother.

The base 10A is further provided with a balancing weight block which is used for increasing the weight of the base 10A to improve the support strength of the base 10A, so that the support mechanism can support a heavier object.

According to the support base 100A provided by the present disclosure, the storage part 60A is arranged in the base 10A; the support mechanism may move relative to the storage part 60A; the support mechanism can extend out of the base 10A from the storage part 60A to support the object, and retract from the storage part 60A and be stored in the base 10A. Therefore, external dust cannot enter the storage part 60A arranged inside the base 10A, thus solving the problem of dust accumulation; and the appearance is simpler and more regular.

Second Embodiment

In the present disclosure, parts of the support base 100B shown in the second embodiment that are the same as the structure of the support base 100B shown in the first embodiment are no longer described repeatedly, and the following mainly describes different structural parts in detail.

Figure 8:
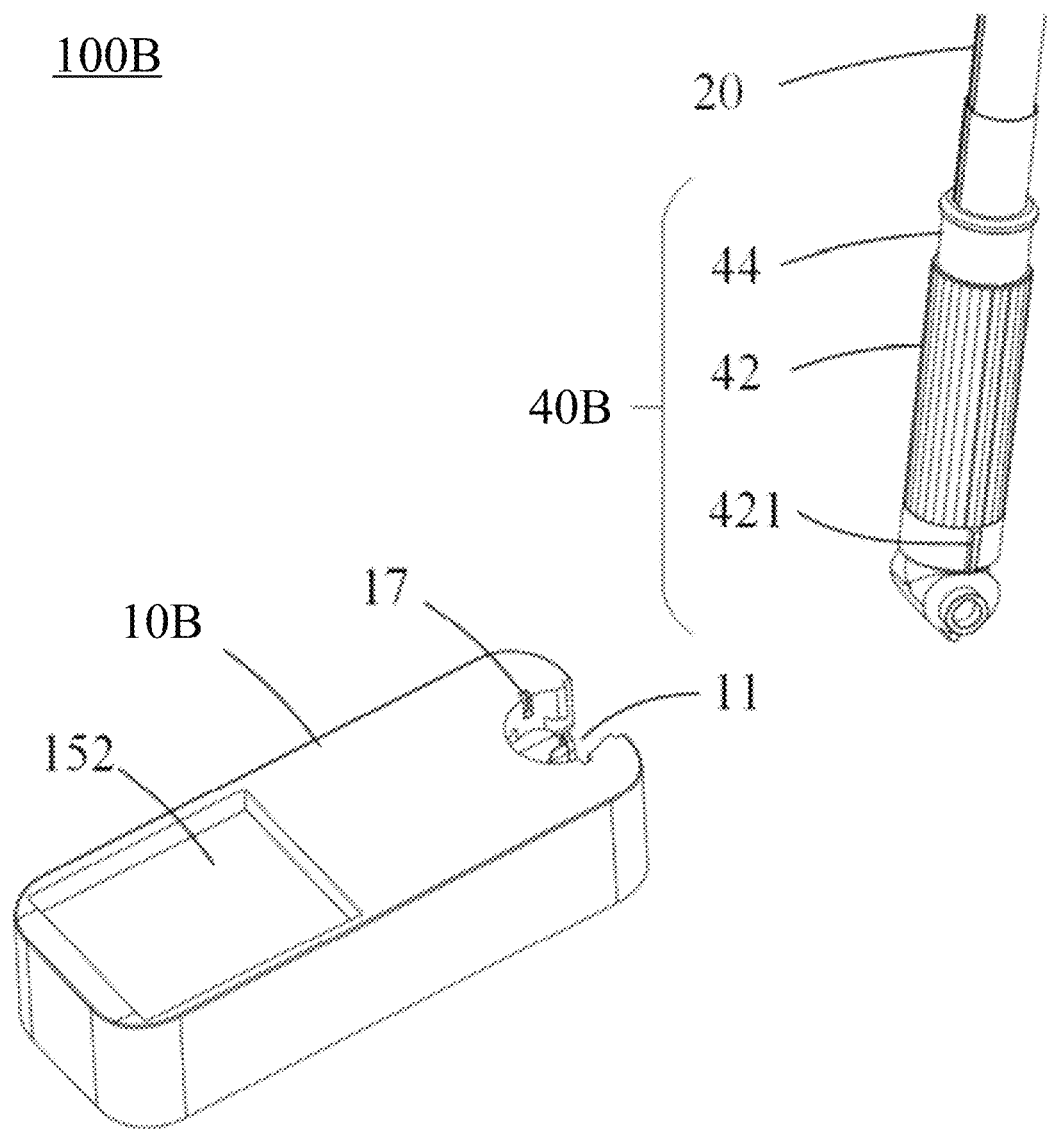
FIG. 8 is a schematic diagram of a disassembled state of a support base according to a second embodiment of the present disclosure.
Figure 9:
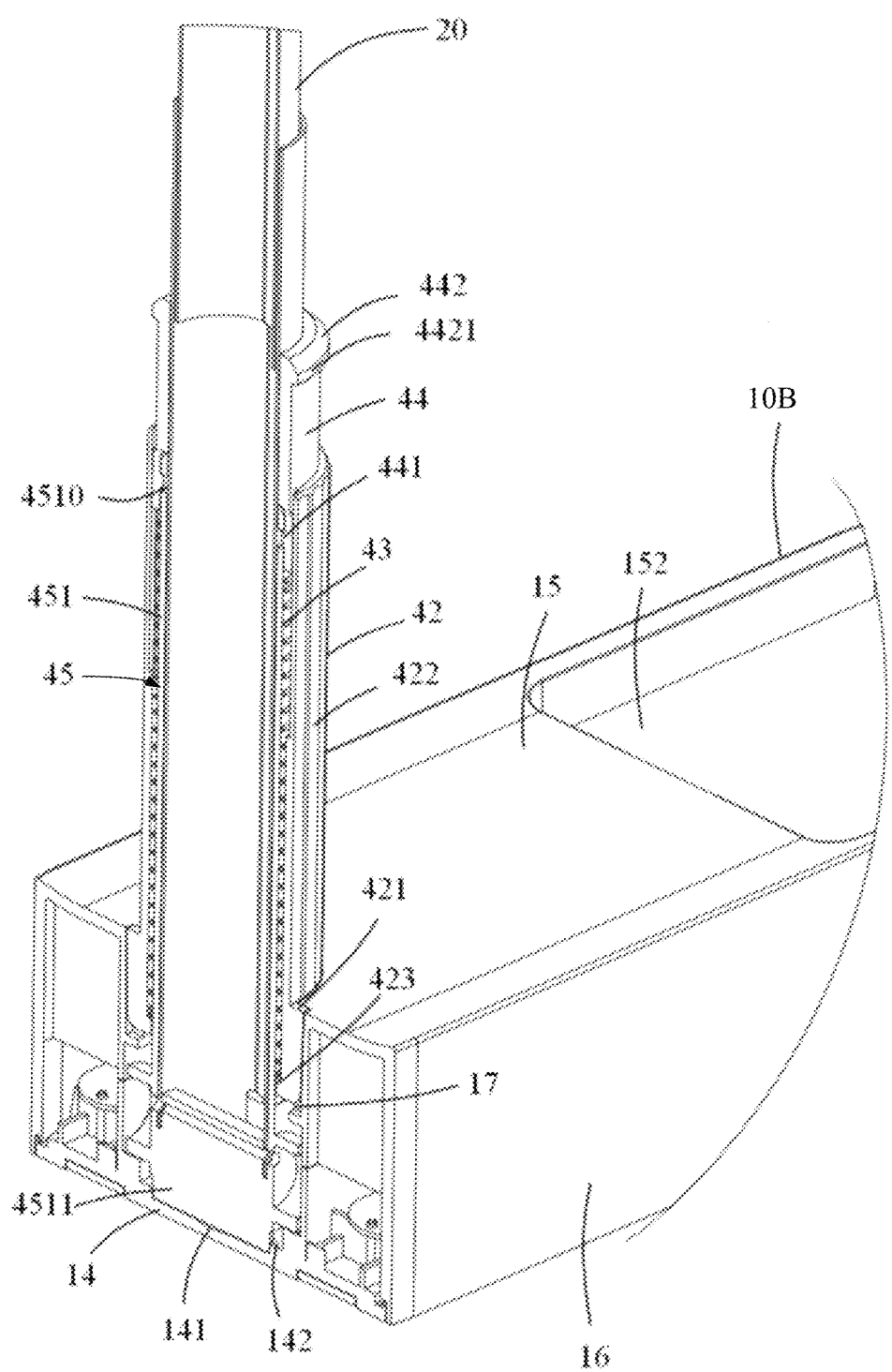
FIG. 9 is a schematic diagram of a sectional structure when a support base is in a support state according to a second embodiment of the present disclosure.

Referring to FIG. 8 and FIG. 9, FIG. 8 is a schematic diagram of a disassembled state of a support base 100B according to a second embodiment of the present disclosure, and FIG. 9 is a schematic diagram of a sectional structure when a support base 100B is in a support state according to a second embodiment of the present disclosure. In all the embodiments, the base 10B includes a bottom plate 14, a cover plate 15 opposite to the bottom plate 14, and a side plate 16 connected between the bottom plate 14 and the cover plate 15. The storage part 60B is located between the bottom plate 14 and the cover plate 15, and the opening 11 is located on the side plate 16. By a simple structural design of the base 10B, the stability of supporting of the base 10B can be improved. Furthermore, due to the opening located on the side plate, it is not easy for dust to enter the upper and lower surfaces of the base, and it is convenient to clean; and the function for supporting the base is unstable due to the dust.

In all the embodiments, a surface of the cover plate 15 away from the bottom plate 14 further has a storage slot 152, and the storage slot 152 is used for storing at least part of the object and/or a remote controller. In detail, the storage slot 152 can store the object, such as a small-size electronic device, or a small-size daily supply, such as at least part of a mobile phone or a tablet bracket, a reading bracket, a fan, a desk lamp or a mirror. Of course, the storage slot 152 may also store one part of the object, such as a remote controller and other small-size objects of the fan or the desk lamp. By adding the storage slot 152, the object can be effectively managed and stored. Loss of the object is reduced, and the user experience is enhanced. The aesthetic appearance of the support base can also be improved.

The storage part 60B includes a sliding chute 142 located between the bottom plate 14 and the cover plate 15, and the support mechanism having the connector 40B and the support member 20 can be slidably connected to the sliding chute 142. The sliding chute 142 can be disposed on a side of the cover plate 15 opposite to the bottom plate 14. When the support mechanism stores or extends out of the storage part 60B, it is slidably connected with the cover plate 15 through the sliding chute 142. The sliding chute 142 can also be arranged on a side of the bottom plate 14 opposite to the cover plate 15. The sliding chute 142 can also be arranged on sides of the bottom plate 14 and the cover plate 15 opposite to the storage part 60B, respectively. Specifically, in this embodiment, the sliding chute 142 is arranged on a side of the bottom plate 14 opposite to the cover plate 15. The support mechanism can better slide through the sliding chute 142, which can reduce the resistance to the sliding of the support mechanism and enhance the experience of the user.

The storage part 60B further includes a clamping slot 141 provided on the bottom plate 14. When the support member 20 is in the support state, the bottom of the connector 40B abuts against the inside of the clamping slot 141. Specifically, the clamping slot 141 can be communicated with the opening 11 and the storage part 60B.

The opening of the clamping slot 141 can completely accommodate the bottom of the connector 40B due to its size, so as to fix the bottom of the connector 40B. In this embodiment, the clamping slot 141 is disposed at an end of the bottom of the sliding chute 142 close to the opening 11 and is communicated with the opening 11. The opening of the clamping slot 141 is smaller than or equal to the opening of the sliding chute 142. Through the clamping slot 141, the connector 40B can be better fixed and supported, thereby improving the supporting stability of the support base 100B.

Figure 10:
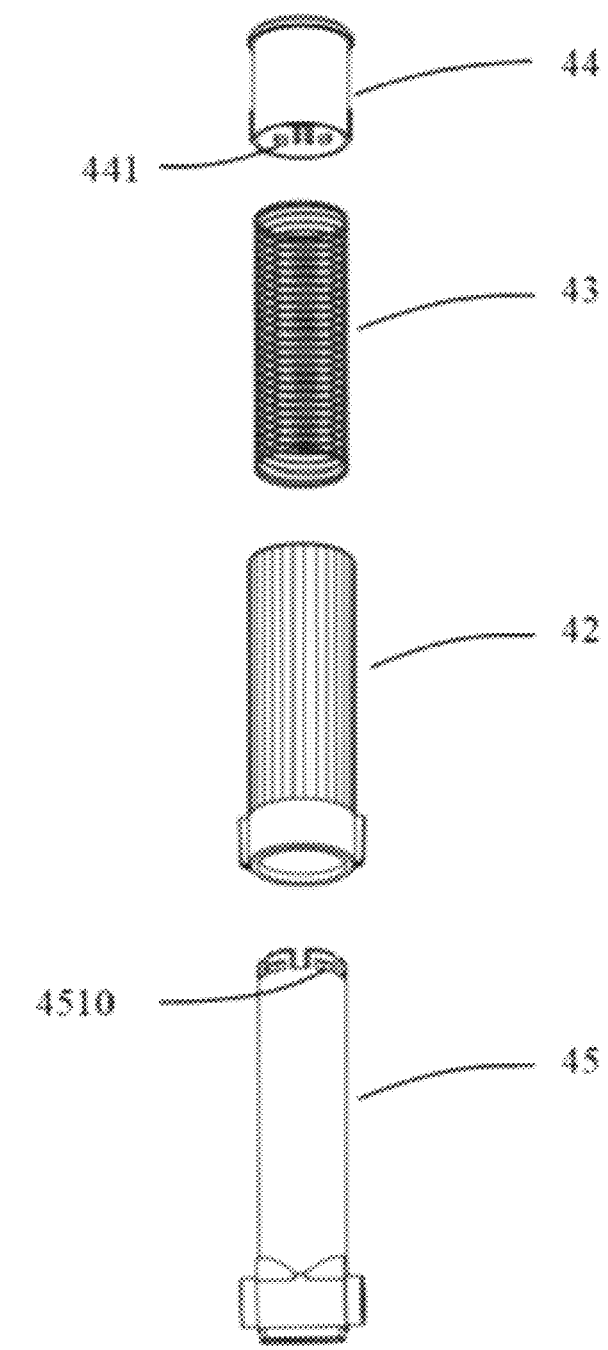
FIG. 10 is a schematic exploded diagram of a partial structure of a connector of a support base according to a second embodiment of the present disclosure.

Referring to FIG. 10, FIG. 10 is a schematic exploded diagram of a partial structure of a connector 40B of a support base 100B according to a second embodiment of the present disclosure. The connector 40B includes an inner sleeve 45 and an outer sleeve 42. The inner sleeve 45 is used for being sleeved outside the support member 20 and can slidably store the support member 20. The inner sleeve 45 is also used for being slidably connected with the sliding chute 142. The outer sleeve 42 is sleeved outside the inner sleeve 45, and the outer sleeve 42 is used for locking the relative position between the support member 20 and the base 10B when the support member 20 is in the support state. By means of arranging the inner sleeve 45, the support member 20 can be better protected, and the service life of the support member 20 can be improved. The support member 20 and the base 10B can be better fixed by the outer sleeve 42, and the supporting stability of the support member 20 can be improved, thereby improving the service life and supporting stability of the support base 100B.

As shown in FIG. 6, in some embodiments, the outer surface of the inner sleeve 45 may have a first thread structure (specifically, a thread structure on the outer surface of the connector 40B as shown in FIG. 6). The inner surface of the outer sleeve 42 has a second thread structure matching with the first thread structure (specifically, a thread structure on the inner surface of the locking sleeve 50 as shown in FIG. 5). The outer sleeve 42 is used for rotating relative to the inner sleeve 45 through the first thread structure and the second thread structure, so as to abut against or be separated from the base 10B. When the outer sleeve 42 abuts against the base 10B, the relative position between the support member 20 and the base 10B can be locked. When the outer sleeve 42 is separated from the base 10B, the support mechanism can rotate around the base 10B. The threaded structure is a relatively common rotating structure, which has good practical effect, has high use stability, and can also reduce the production cost. However, in this embodiment, the outer sleeve 42 includes a first locking part 421 disposed on a surface away from the inner sleeve 45. The base 10B includes a second locking part 17 corresponding to the first locking part 421. The first locking part 421 is used for being in fastened or sliding fit with the second locking part 17 to lock the relative position between the support member 20 and the base 10B. Through the cooperative locking of the first locking part 421 and the second locking part 17, the supporting stability of the support mechanism can be improved, thereby improving the supporting stability of the support base 100B.

In this embodiment, one of the first locking part 421 and the second locking part 17 may be a sliding block, and the other one of the first locking part 421 and the second locking part 17 is a sliding slot matching with the sliding block. In detail, in this embodiment, the first locking part 421 is a sliding block, and the second locking part 17 is a sliding slot. In some other embodiments, the first locking part 421 can be a sliding slot, and the second locking part 17 is a sliding block. The sliding-fit locking structure is a relatively common locking structure with high stability of the locking effect and low cost, which can effectively reduce the production cost and improve the supporting stability of the support base 100B.

The inner sleeve 45 includes a first sleeve main body 451. The connector 40B further includes an elastic element 43 and a limiting sleeve 44 connected to one end of the first sleeve main body 451. The limiting sleeve 44 is located at an end of the first sleeve main body 451 away from the base 10B when the support mechanism is in the support state. The outer sleeve 42 includes a second sleeve main body 422 and a first limiting end 423 connected to one end of the second sleeve main body 422. The elastic element 43 is clamped between the limiting sleeve 44 and the first limiting end 423. The elastic element 43 is used for driving, through the first limiting end 423, the outer sleeve 42 to move towards one side of the base 10B, so that the first locking part 421 slides into the second locking part 17 and is locked with the second locking part 17. In detail, the elastic element 43 may be a spring, but is not limited to the above. The elastic element 43 can better drive the fixing of the outer sleeve 42 and the base 10B through its own elastic force, which makes the operation more convenient and labor-saving, improves the user experience, and reduces the wear degree of each component structure, thereby prolonging the life of the product.

The first sleeve main body 451 further includes a first fastener part 4510; the limiting sleeve 44 includes a second fastener part 441 that cooperates with the first fastener part 4510; and the first fastener part 4510 is fastened with the second fastener part 441, so that the limiting sleeve 44 is connected with the first sleeve main body 451. The fastening fit between the first fastener part 4510 and the second fastener part 441 can better fix the limiting sleeve 44 and the first sleeve main body 451, improve the stability of the connector 40B, and then further improve the supporting stability of the support base 100B.

The limiting sleeve 44 further includes a side wall structure 442 and a second limiting end 4421 disposed on a side of the side wall structure 442 away from the first sleeve main body 451. The second limiting end 4421 is used for abutting against and limiting the end of the outer sleeve 42 away from the base 10B when the support mechanism is in the support state. The second limiting end 4421 can better limit the position of the outer sleeve 42, so as to avoid the outer sleeve 42 from having a large position movement, thereby affecting the fixing effect of the outer sleeve 42 and the base 10B and affecting the stability of the connector 40B.

Figure 11:
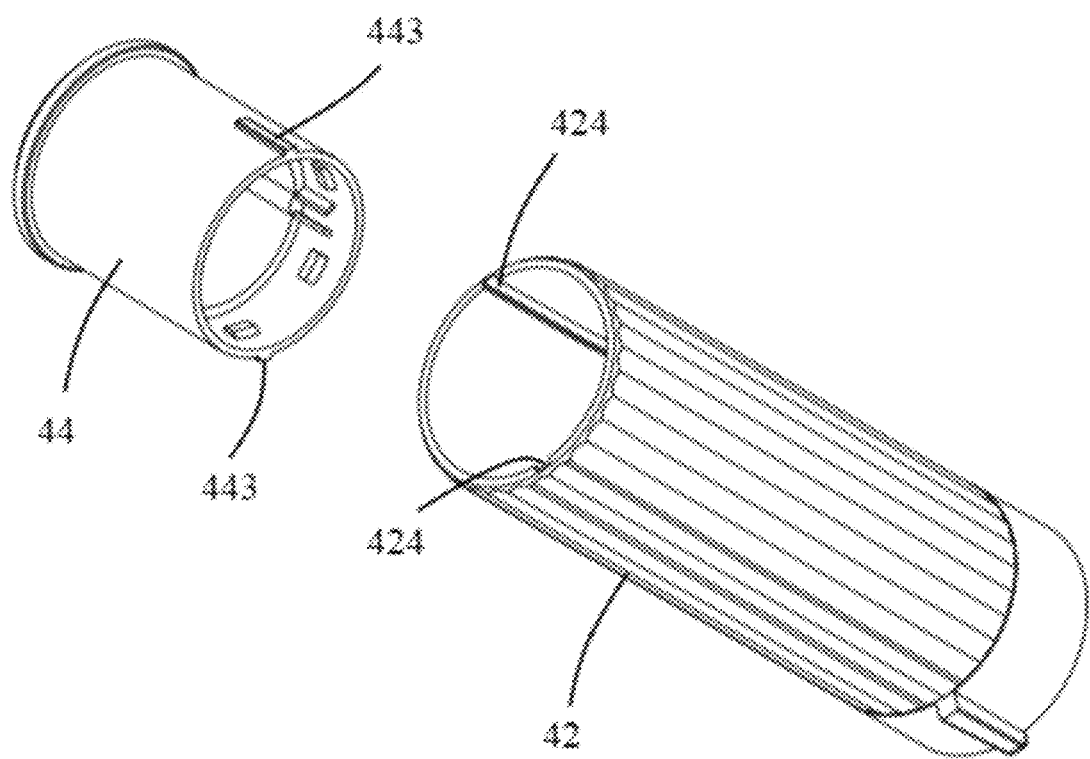
FIG. 11 is a schematic diagram of a partial structure of the connector shown in FIG. 10.

Referring to FIG. 11, FIG. 11 is a schematic diagram of a partial structure of the connector 40B shown in FIG. 10. The outer sleeve 42 further includes a first limiting member 424 located on the inner surface; the limiting sleeve 44 further includes a second limiting member 443 located on the outer surface and matching with the first limiting member 424; the first limiting member 424 is in sliding fit with the second limiting member 443; and one of the first limiting member 424 and the second limiting member 443 is a sliding slot, and the other one of the first limiting member 424 and the second limiting member 443 is a strip-type bulge. Specifically, in this embodiment, the first limiting member 424 is a sliding chute, and the second limiting member 443 is a strip-type bulge. In some other embodiments, the first limiting member 424 is a strip-type bulge, and the second limiting member 443 is a sliding chute. In detail, in this embodiment, there are two first limiting members 424 and two second limiting members 443. In other embodiments, the corresponding numbers of the first limiting member 424 and the second limiting member 443 may be one or more. By the sliding fit between the first limiting member 424 and the second limiting member 443, an effect of fixing the outer sleeve 42 and the limiting sleeve 44 can be further achieved, so that the relative rotation between the outer sleeve 42 and the limiting sleeve 44 is reduced, thus improving the stability of the connector 40B and better ensuring the supporting stability of the support mechanism.

In some embodiments, the storage part 60B includes a clamping slot 141 arranged on the bottom plate 14, and the inner sleeve 45 further includes a first fastener end 4511 connected to the first sleeve main body 411. When the support member 20 is in the support state, the first fastener end 4511 is stored in the clamping slot 141. By fastening between the clamping slot 141 and the first fastener end 4511, the connector 20 can be better fixed and supported, thereby improving the supporting stability of the support base 100B.

Third Embodiment

In the present disclosure, parts of the support base 100C shown in the third embodiment that are the same as the structures of the support bases 100A, 100B shown in the previous two embodiments are no longer described repeatedly, and the following mainly describes different structural parts.

Figure 12:
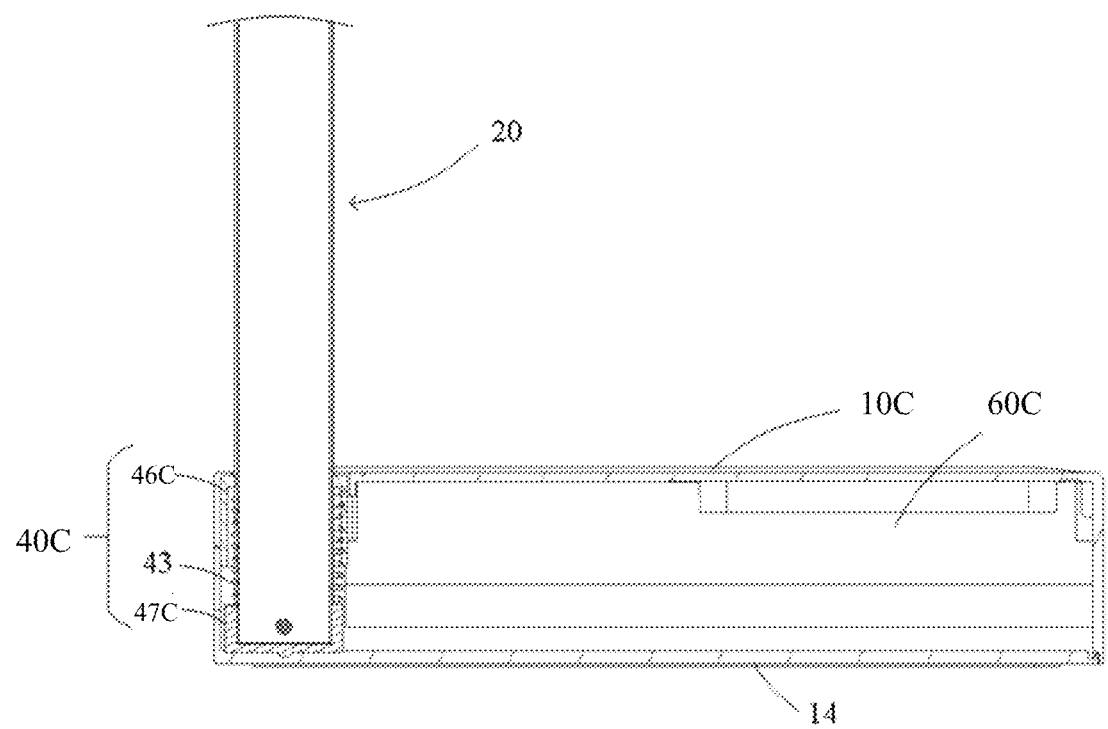
FIG. 12 is a schematic diagram of a sectional structure when a support base is in a support state according to a third embodiment of the present disclosure.

Referring to FIG. 12, FIG. 12 is a schematic diagram of a sectional structure when a support base is in a support state according to a third embodiment of the present disclosure. In this embodiment, the connector 40C includes a sleeve body 46C, a rotating end 47C, and an elastic element 43 located between the sleeve body 46C and the rotating end 47C. The sleeve body 46C is rotatably connected with the base 10C. The sleeve body 46C is sleeved outside the support member 20, and the support member 20 can slide relative to the sleeve body 46C. The rotating end 47C is arranged at an end of the support member 20 away from the object. The base 10C includes a bottom plate 14. The storage part 60B is located on a side of the bottom plate 14 adjacent to the support member 20. When the support member 20 is in the support state, the rotating end 47C is located between the sleeve body 46C and the bottom plate 14, and the elastic element 43 is compressed to resist against the sleeve body 46C and the rotating end 47C, so that a side of the rotating end 47C away from the support member 20 abuts against the bottom plate 14. When the support mechanism rotates relative to the base 10C, the extending direction of the support member 20 and the extending direction of the storage part 60B are the same, and the elastic element 43 can release the elastic force to drive the rotating end 47C to drive the support member 20 to slide into the storage part 60B. By use of the elasticity of the elastic member 43, the support ember 20 can be better compressed into the storage part 60B, thus reducing an external force used by a user and enhancing the experience of the user. At the same time, when the support member 20 is in the support state, the elasticity of the elastic member 43 can be used to better support the support member 20, thus improving the stability of the support base 100C.

Figure 13:
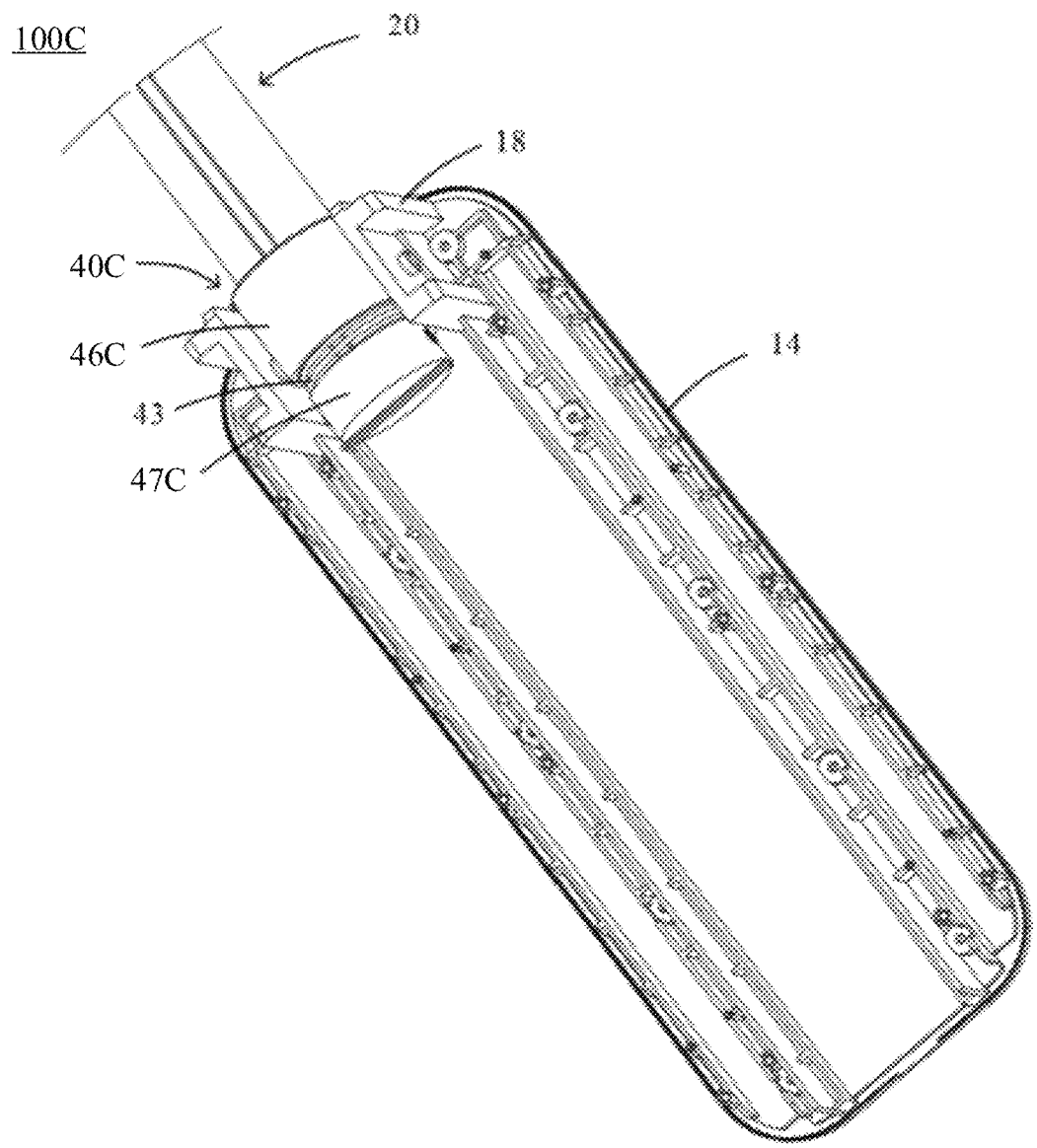
FIG. 13 is a schematic diagram of a partial structure of a support base according to a third embodiment of the present disclosure.
Figure 14:
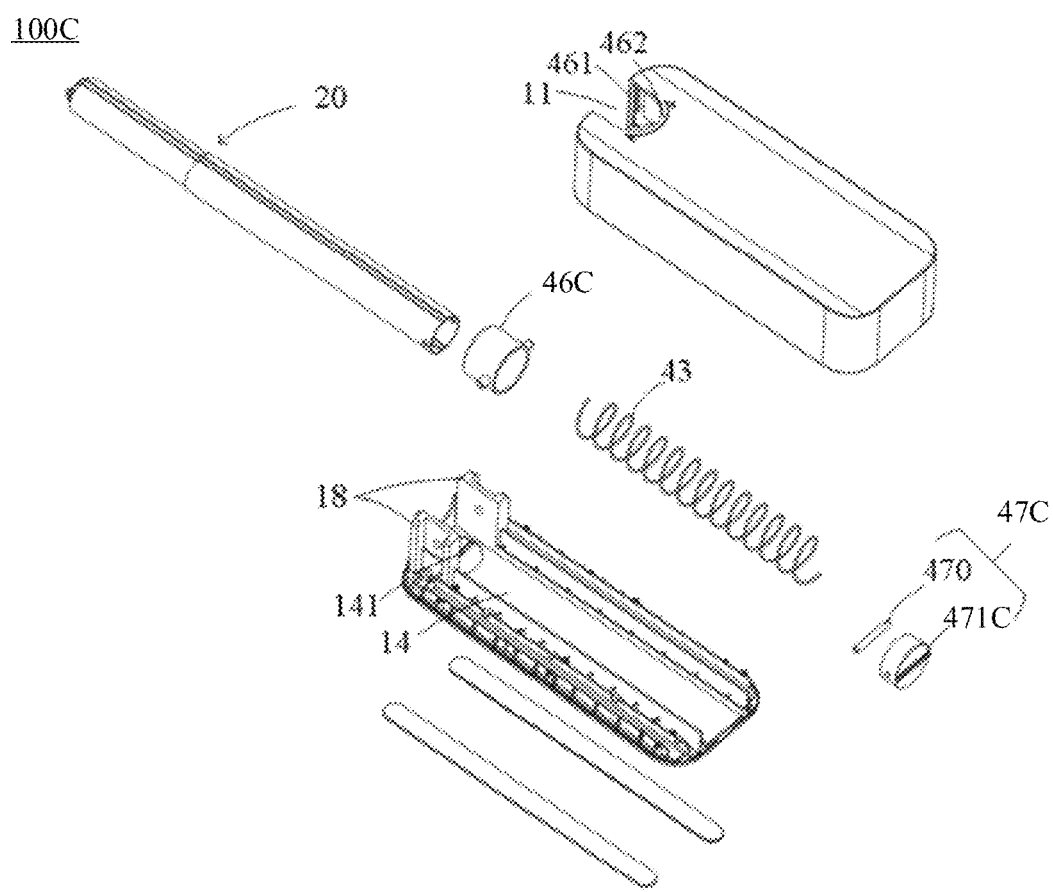
FIG. 14 is a schematic exploded structural diagram of the support base in the embodiment shown in FIG. 13.

Referring to FIG. 13 and FIG. 14, FIG. 13 is a schematic diagram of a partial structure of a support base 100C according to a third embodiment of the present disclosure, and FIG. 14 is a schematic exploded structural diagram of the support base 100C shown in FIG. 13. The sleeve body 46C is rotatably connected with the base 10C. The base 10C further includes two extending parts 18 connected to the side of the bottom plate 14 adjacent to the support member 20. The two extending parts 18 are adjacent to the opening 11 and are opposite to each other. Two ends of the sleeve body 46C are rotatably connected with the two extending parts 18, respectively. Specifically, the sleeve body 46C has two first pivot parts. The extending parts 18 have second pivot parts corresponding to the first pivot parts. The first pivot parts and the second pivot parts cooperate with each other to rotatably connect the sleeve body 46C with the extending parts 18. A pivot arranged on the outer side of the sleeve body 46C extends into pivot holes of the extending parts 18 to achieve the above rotatable connection. Another pivot may pass through the sleeve body 46C and the extending parts 18 to achieve the above rotatable connection. The elastic element 43 may be a spring sleeved at a periphery of the support member 20, but it is not limited to the above. The sleeve body 46C includes a substrate part 461 having an opening, and an annular side wall part 462 connected to an edge of the substrate part 461; the spring is located between the substrate part 461 and the rotating end 47C, and an end of the spring adjacent to the substrate part 461 may be located in a storage space encircled by the substrate part 461 and the side wall part 462. In addition, when the support base 100C is in the support state, the spring may be also basically all accommodated in the storage space encircled by the substrate part 461 and the side wall part 462. At this time, the sleeve body may be in contact with the rotating end 47C, so that the elastic element 43 is completely hidden. By the arrangement of the two extending parts 18, the sleeve body 46C can be better fixed, thus improving the supporting stability of the support member 20 and improving the stability of the support base 100C. The elastic element 43 is stored by the substrate part 461 and the side wall part 462, which can also hide the spring. The appearance of the support base 100C is more attractive. However, in some change embodiments, when the support base 100C is in the support state, the elastic element 43 may also be exposed from the sleeve body 46C. At this time, the outer surface of the elastic element 43 can be electroplated with a metal coating layer or a resin coating layer to achieve a protecting effect and make the appearance attractive.

The rotating end 47C includes a rotating main body 470 and a second fastener end 471C arranged on a side of the rotating main body 470 away from the support member 20. The storage part 60C includes a clamping slot 141 provided on the bottom plate 14. When the support member 20 is in the support state, the second fastener end 471C is stored in the clamping slot 141. The clamping slot 141 and the second fastener end 471C cooperate with each other in a mutually fastened manner, so that the rotating end 47C is better fixed on the base 10C, thus improving the supporting stability of the support member 20 and improving the stability of the support base 100C.

Fourth Embodiment

In the present disclosure, parts of the support base 100D shown in the fourth embodiment that are the same as the structures of the support bases 100D shown in the previous two embodiments are no longer described repeatedly, and the following mainly describes different structural parts.

Figure 15:
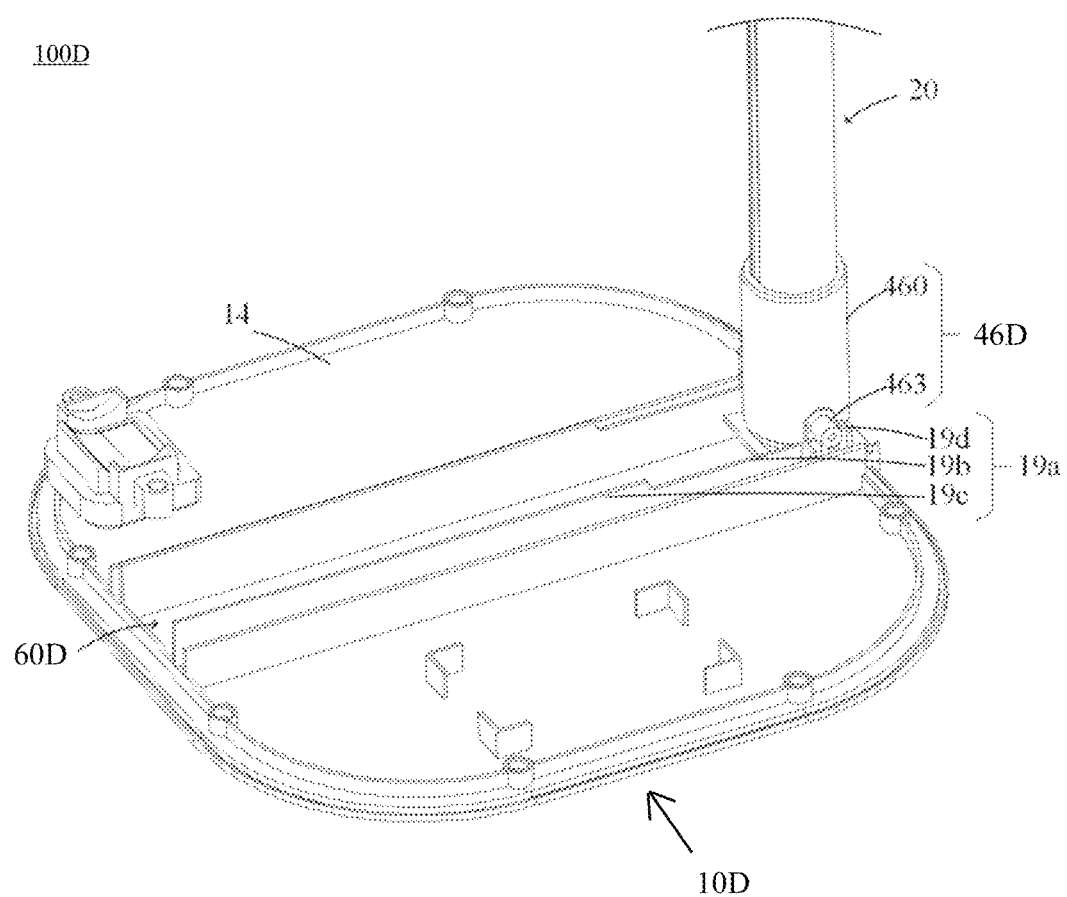
FIG. 15 is a schematic diagram of a sectional structure when a support base is in a support state according to a fourth embodiment of the present disclosure.
Figure 16:
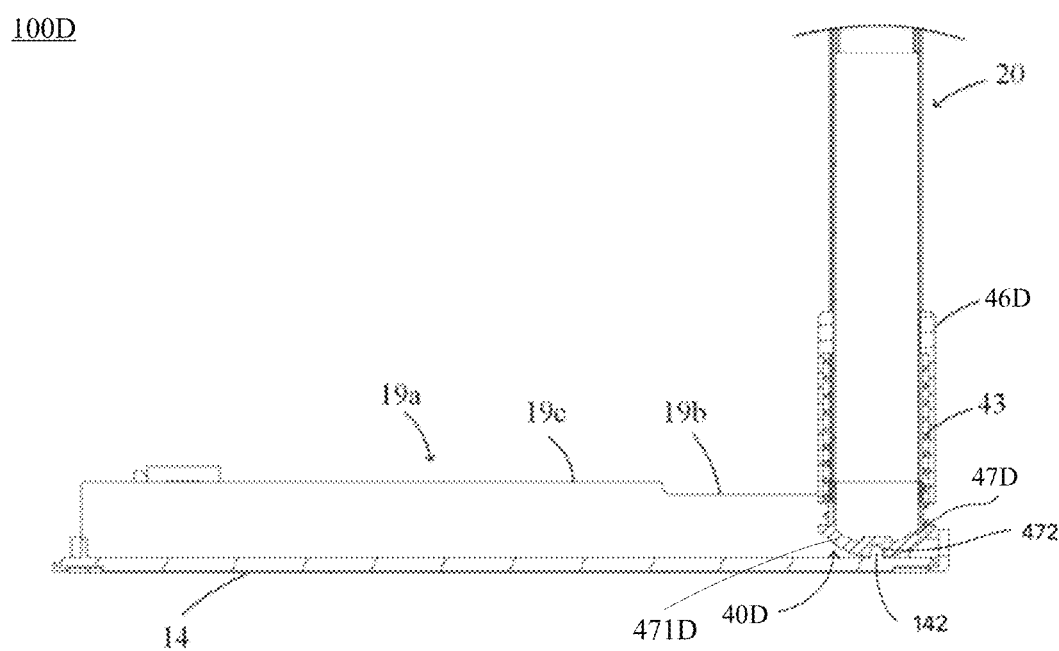
FIG. 16 is a schematic diagram of a partial three-dimensional structure of a support base according to a fourth embodiment of the present disclosure.

Referring to FIG. 15 to FIG. 16, FIG. 15 is a schematic diagram of a sectional structure when a support base 100D is in a support state according to a fourth embodiment of the present disclosure; and FIG. 16 is a schematic diagram of a partial three-dimensional structure of a support base 100D according to a fourth embodiment of the present disclosure. In this embodiment, the sleeve body 46D is slidably connected with the base 10D. The base 10D further includes a first extending part 19a connected to the side of the bottom plate 14 adjacent to the support member 20. Two first extending parts 19a are opposite to each other. The storage part 60D is located between the two first extending parts 19a. Each extending part 19a includes a first part 19b adjacent to the opening 11, a second part 19c connected with the first part 19b, and a third part 19d located at an end of the first part 19b away from the second part 19c; heights of the second part 19c and the third part 19d are greater than that of the first part 19b, so that the second part 19c, the first part 19b, and the third part 19d are encircled to form a first gap part; the sleeve body 46D includes a main body 460 sleeved at a periphery of the support member 20 and extending shafts 463 connected to two sides of the main body 460; the extending shafts 463 are slidably connected to the first gap part; the extending shafts 463 may rotate relative to the third part 19d; when the support base 100D is in the support state, the extending shafts 463 abut against the third part 19d; when the support mechanism rotates relative to the base 10D, and the extending shafts 463 rotate relative to the third part 19d, the extending direction of the support member 20 is the same as that of the storage part 60D; the elastic element 43 may release the elastic force to drive the rotating end 47D to drive the support member 20 to slide into the storage part 60D; the extending shafts 463 may slide along the first gap part, so that the sleeve body 46D slides into the storage part 60D; and the extending shafts 463 may abut against the second part 19c. In detail, structures of the first part 19b that are respectively connected with the second part 19c and the third part 19d can be set to have certain radians, so that the extending shafts 463 can better slide along the first gap part. Structures of the first part 19b that are respectively connected with the second part 19c and the third part 19d can also be other structural shapes having certain angles. Since the first extending parts 19a are symmetrically disposed, the support member 20 slides more quickly and steadily when extending out of or stored in the storage part 60D. Due to the structural design of the first gap part, wear between the sleeve body 46D and the base 10D can be better reduced, and the service life of the product is prolonged. In addition, due to the structural design of the sleeve body 46D, components inside the sleeve body 46D are better protected, and the appearance of the product is more attractive.

Specifically, a strip-type bulge 142 may also be provided on the bottom plate 14, and the bottom of the rotating end 47D is provided with a clamping slot 472. The bulge 142 and the clamping slot 472 can be matched and fastened with each other. In other embodiments, for example, in the third embodiment, the clamping slot 141 may be provided on the bottom plate 14, and the bottom of the rotating end 47D may be provided with the bulge 471D. The bulge 471D and the clamping slot 141 can be matched and fastened with each other. When the support member 20 is in the support state, the bottom (namely the bulge 471D) of the connector 40D abuts against the inside of the clamping slot 141.

Figure 17:
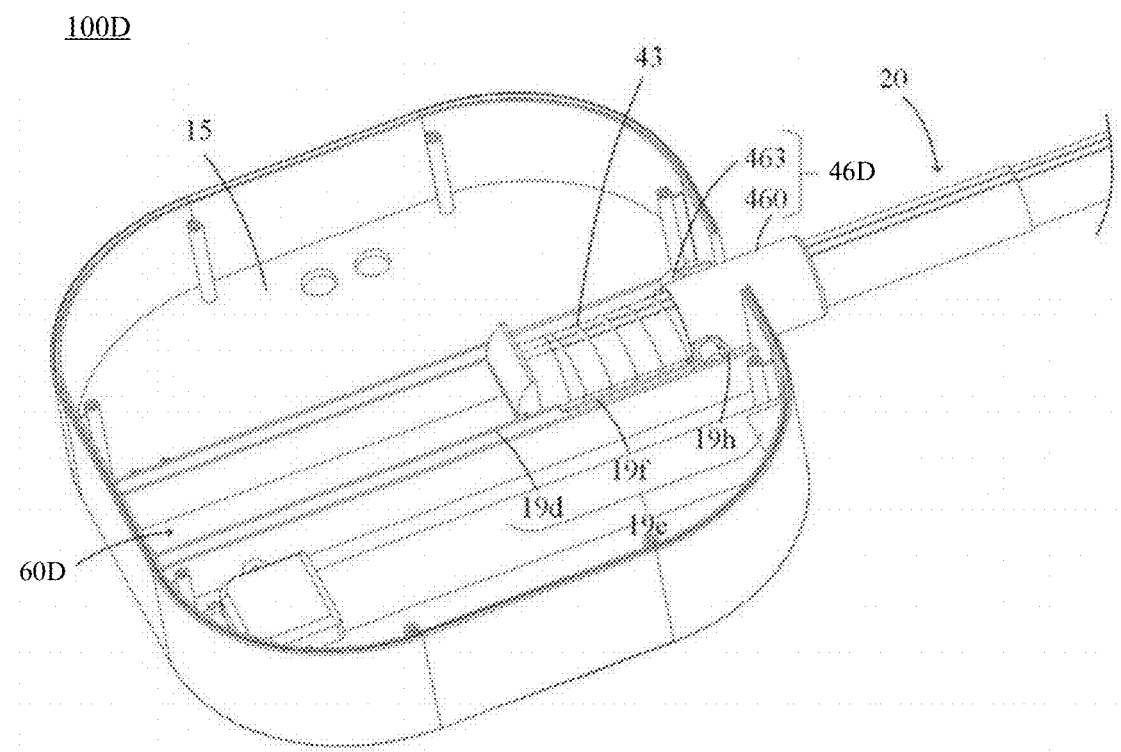
FIG. 17 is a schematic diagram of a back surface of a cover plate of a base of a support base according to a fourth embodiment of the present disclosure.

Referring to FIG. 17, FIG. 17 is a schematic diagram of a back surface of a cover plate 15 of a base 10D of a support base 100D according to a fourth embodiment of the present disclosure. The base 10D further includes a cover plate 15 and a second extending part 19e connected to a side of the cover plate 15 adjacent to the bottom plate 14; the cover plate 15 may be opposite to the bottom plate 14; the storage part 60D is located between the cover plate 15 and the bottom plate 14 and is adjacent to one side of the support member 20. Two second extending parts 19e are opposite to each other, and the storage part 60D is located between the two second extending parts 19e. Each second extending part 19e includes a fourth part 19f adjacent to the opening 11, a fifth part 19g connected with the fourth part 19f, and a sixth part 19h located at an end of the fourth part 19f away from the fifth part 19g; heights of the fifth part 19e and the sixth part 19h are greater than that of the fourth part 19f, so that the fifth part 19g, the fourth part 19f, and the sixth part 19h are encircled to form a second gap part; the second gap part and the first gap part are opposite to each other; the extending shafts 463 are also slidably connected to the second gap part, and the extending shafts 463 may rotate relative to the sixth part 19h; when the support base 100D is in the support state, the extending shafts 463 also abut against the sixth part 19h; when the support mechanism rotates relative to the base 10D, and the extending shafts 463 rotate relative to the sixth part 19h, the extending direction of the support member 20 is the same as the extending direction of the storage part 60D. The elastic element 43 can release the elastic force to drive the rotating end 47D to drive the support member 20 to slide into the storage part 60D; the extending shafts 463 can slide along the second gap part, so that the sleeve body 46 slides into the storage part 60D, and the extending shafts 463 may abut against the fifth part 19g. In detail, structures of the fourth part 19f that are respectively connected with the fifth part 19g and the sixth part 19h can be set to have certain radians, so that the extending shafts 463 can better slide along the second gap part. Structures of the fourth part 19f that are respectively connected with the fifth part 19g and the sixth part 19h can also be other structural shapes having certain angles. The second extending part 19e corresponding to the first extending part 19a is provided on the cover plate 15 of the base 10D, which can better protect the inner structures of the sleeve body 46D and can also ensure that the support member 20 slides more quickly and steadily when extending out of or stored in the storage part 60D, thus enhancing the experience of the user.

In conclusion, in the second to fourth embodiments, the base 10D includes a first fastener part (such as 141, 142). The side of the connector 40D away from the support member 20 includes a second fastener part (such as 4511, 471C, 472). One of the first fastener part and the second fastener part is a clamping slot (such as 141, 472), and the other one of the first fastener part and the second fastener part is a bulge (such as 4511, 471D, 142) that may be received and fastened in the clamping slot (such as 141, 472); and when the support member 20 is in the support state, the first fastener part and the second fastener part are fastened to each other, so that the support mechanism can stably support the object.

Referring to FIG. 1 to FIG. 17, an embodiment of the present disclosure further provides a support base 100A, 100B, 100C or 100D used for supporting the object. The support base 100A, 100B, 100C or 100D includes a base 10A, 10B, 10C or 10D, a telescopic rod, and a connecting sleeve; a sliding chute is arranged in the base 10A, 10B, 10C or 10D; an opening 11 is formed in a side surface of the base 10A, 10B, 10C or 10D; the opening 11 is communicated with the sliding chute; and a gap 12 is formed in a position where the opening 11 is connected with one surface of the base 10A, 10B, 10C or 10D. The top end of the telescopic rod is connected with a hinge member 30; the hinge member 30 is used for being hinged to an object; one end of the connecting sleeve is sleeved on the telescopic rod, and the other end extends towards two sides to form a sliding part 41; the sliding part 41 is slidably connected to the sliding chute, so that the connecting sleeve can be switched between a stored state where the connecting sleeve is stored in the sliding chute and an extending state where at least part of the connecting sleeve extends out of the sliding chute; and part or all of a circumferential surface of the sliding part 41 is an arc surface.

By implementing this embodiment, the sliding chute is provided in the base 10A, 10B, 10C or 10D, and the sliding part 41 of the connecting sleeve is slidably connected to the sliding chute. During supporting, the connecting sleeve can extend out of the sliding chute and rotate relative to the base 10A, 10B, 10C or 10D to abut against the gap 12 formed in the base 10A, 10B, 10C or 10D, so that the telescopic rod sleeved on the connecting sleeve can support the object. During storage, the connecting sleeve can retract into the sliding chute and be stored in the base 10A, 10B, 10C or 10D.

Referring to FIG. 18a to FIG. 20, an embodiment of the present disclosure further provides an electronic device, including: a device main body and a support base 100. The support base 100 is the support base 100A, 100B, 100C or 100D in any one of the above embodiments. The device main body is hinged to the support mechanism, so that the device main body can be stored on the base 10 (the base 10 is the base 10A, 10B, 10C, or 10D). The electronic device is a small-size electric device, such as a fan, a desk lamp, a speaker, an illuminating or light-supplementing make-up mirror, a mobile phone or a tablet bracket capable of achieving illumination or light supplementation, and a reading bracket.

Figure 18A:
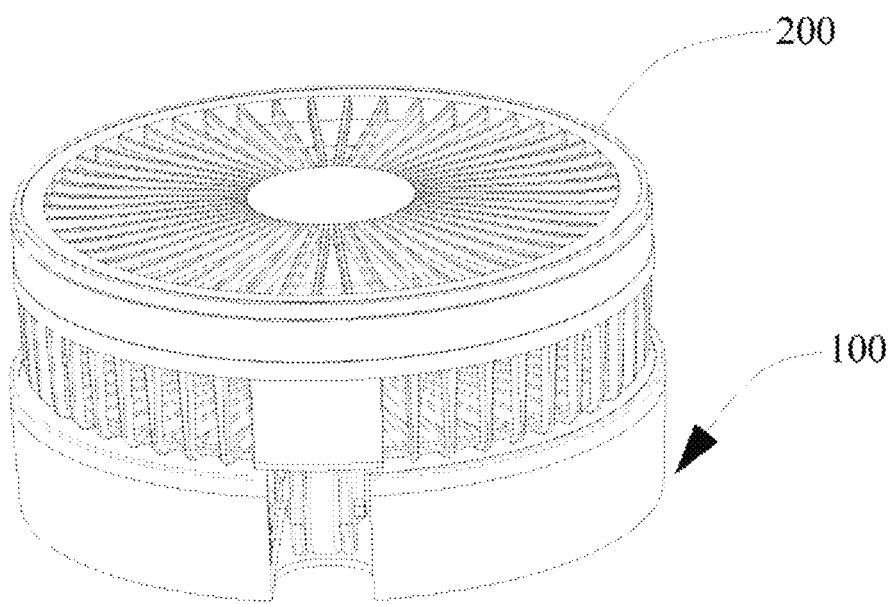
FIG. 18*a* is a schematic diagram of a storage state of a fan according to one embodiment of the present disclosure.
Figure 18B:
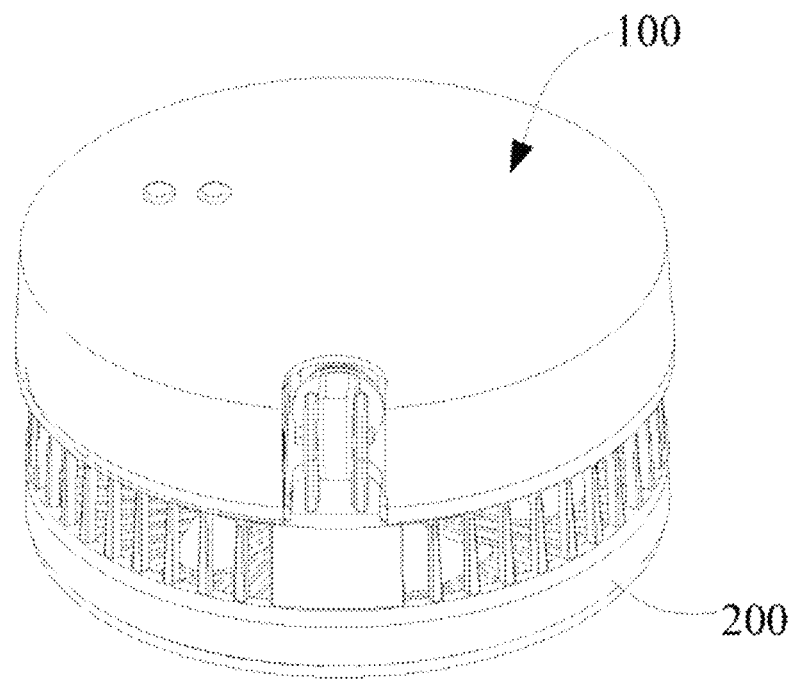
FIG. 18*b* is another schematic diagram of a storage state of a fan according to one embodiment of the present disclosure.

In one embodiment, referring to FIG. 18a, FIG. 18b, and FIG. 19, the electronic device may be a fan. The fan includes a fan main body 200 and a support base 100. The fan main body 200 is hinged to the support mechanism. When the support mechanism is stored in the base 10, the fan main body 200 can be superimposed on the upper surface or the lower surface of the base 10. Specifically, the fan main body 200 may output air independently. The fan main body 200 may be a turbofan, or a bladeless fan, which is not limited here. The fan main body 200 is hinged to the hinge member 30. Therefore, when the support mechanism is stored in the storage part 60A, 60B, 60C, or 60D, the fan main body 200 can rotate relative to the base 10 and be folded on and integrated with the base 10, so that the storage is more convenient, and the appearance is neat and attractive. It is convenient to carry. Furthermore, the fan main body 200 is hinged to the hinge member 30 and can also rotate to adjust an air outlet direction, and the flexibility is high. As shown in FIG. 18a and FIG. 18b, gaps 12 in this embodiment are provided on the upper surface and the lower surface of the base 10 and are both communicated with the opening 11. Therefore, when the fan main body 200 is superimposed on the base 10, it can be superimposed on the upper surface or the lower surface of the base 10.

Figure 21:
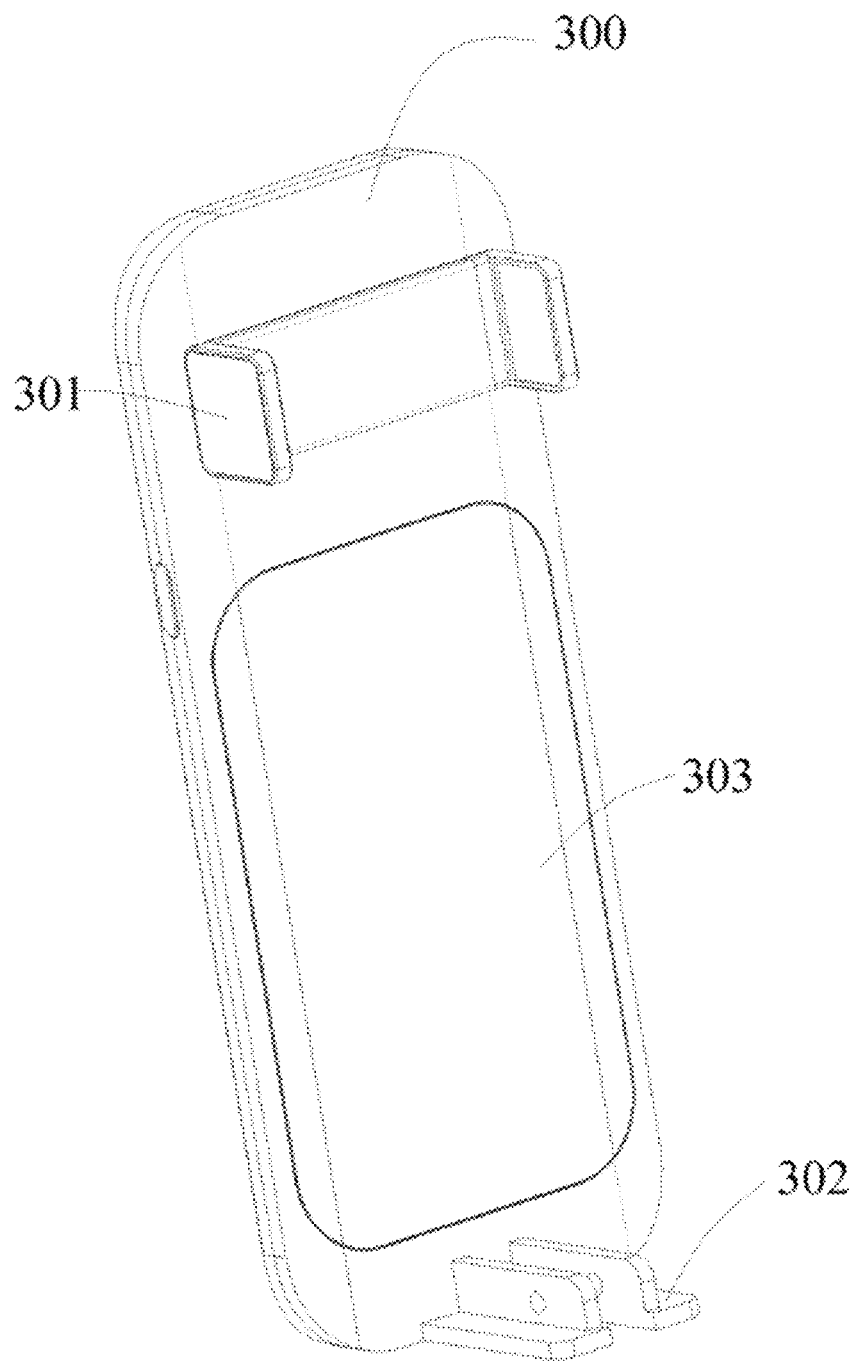
FIG. 21 is a schematic diagram of a clamp main body of a selfie device according to one embodiment of the present disclosure.
Figure 22:
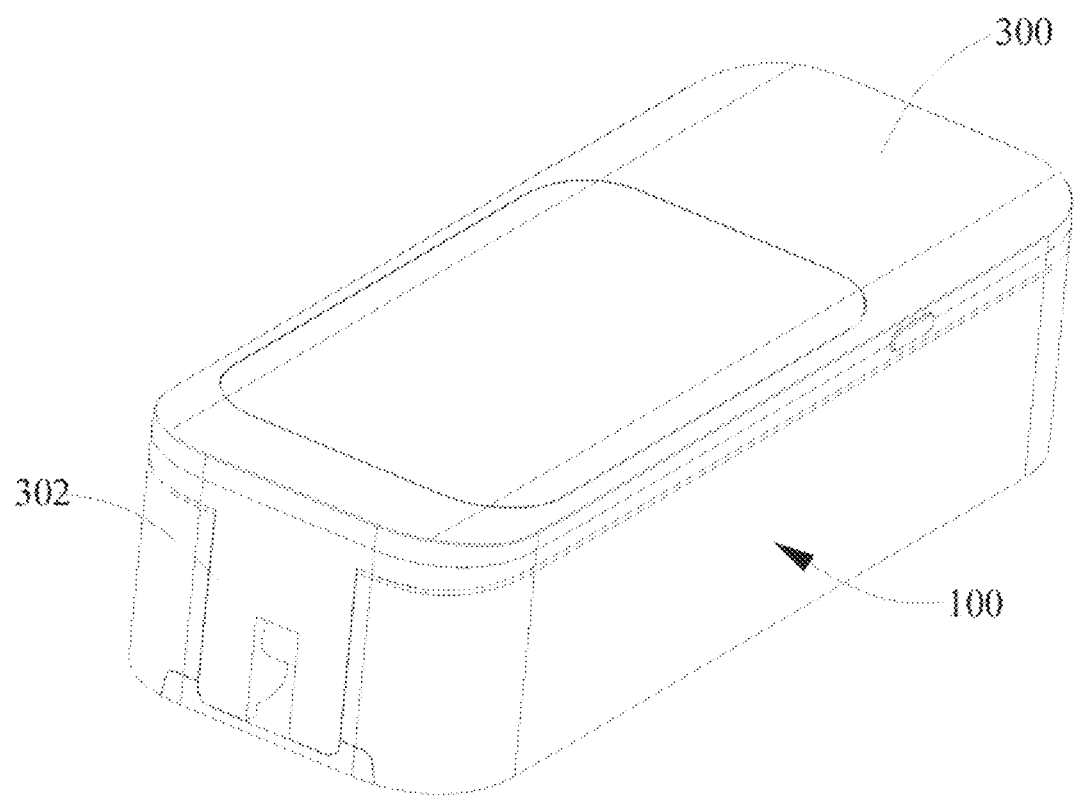
FIG. 22 is a schematic diagram of a storage state of a selfie device according to one embodiment of the present disclosure.

In one embodiment, referring to FIG. 20 to FIG. 22, the electronic device can also be a selfie device, such as a selfie bracket used for live broadcasting or capturing and capable of clamping a mobile phone, a tablet computer, a camera, a camera lens, and the like. Specifically, the selfie device includes a clamp main body 300 and a support base 100. The support base 100 may use the support base 100 in any one of the above embodiments. The clamp main body 300 is hinged to the support mechanism. When the support mechanism of the support base 100 is stored in the base 10, the clamp main body 300 may be superimposed on the upper surface or the lower surface of the base 10. Specifically, the clamp main body 300 is provided with a clamping part 301. The clamping part 301 is used for clamping a mobile phone or other electronic devices. The base 10 is further provided with a groove 13 or 152 for accommodating the clamping part 301. When the clamp main body 300 is stored on the base 10, the clamping part 301 is stored in the groove 13 or 152. The clamp main body 300 is further provided with a fastening part. The clamp main body 300 is hinged to the hinge member 30 through the fastening part. Therefore, when the support mechanism is stored in the storage part 60, the clamp main body 300 can rotate relative to the base 10 and be folded on and integrated with the base 10, so that the storage is more convenient, and the appearance is neat and attractive. It is convenient to carry. Furthermore, when the clamp main body 300 is rotatably stored on the base 10, the fastening part 302 is fastened at the gap 12 of the base 10. Therefore, the fastening part 302 is fastened at the gap 12 of the base, which can close the gap 12 to prevent the dust and improve the sealing property. In this embodiment, light supplementation lamps 303 are arranged on both a first surface and a second surface opposite to the first surface of the clamp main body 300. The light supplementation lamps 303 are used for supplementing light when a selfie function of a mobile phone is enabled.

In other embodiments, the electronic device may also be a live broadcasting apparatus, a tripod head, a speaker device, a projection device, and the like. There are various types of electronic devices, and will not be repeatedly described here one by one. All types of electronic devices are applicable to the support base 100 of this embodiment and shall all fall within the protection scope of the present disclosure.

According to the electronic device provided by the embodiments of the present disclosure, the storage part 60 is arranged inside the base 10, and the support mechanism is movably connected to the storage part 60. During supporting, the support mechanism can extend from the storage part 60 to support the device main body. During storage, the support mechanism can retract into the storage part 60 and be stored in the base 10. Therefore, when the support structure is storable, the storage part 60 is arranged in the base 10, so that dust cannot enter it, and the problem of dust accumulation is solved.

What is claimed is:

1. A support base, used for supporting an object, comprising:
   a base provided with a storage part, an opening being formed in a side surface of the base, and being communicated with the storage part; and
   a support mechanism slidably connected to the storage part, the support mechanism is configured to slide along the storage part so that at least part of the support mechanism is allowed to extend out of the base from the opening to support the object and is allowed to retract into the storage part from the opening and be stored in the base;
   wherein the support mechanism comprises a support member and a connector; a top end of the support member is used for supporting the object; the connector is sleeved on an outside of the support member; and the connector is slidably connected with the storage part and rotatable relative to the base when the support member extends out of the opening, so as to drive the support member to rotate relative to the base and cause the support member to be in a support state;
   wherein a gap is provided at an edge of an upper surface or a lower surface of the base, and the gap is communicated with the opening; and the connector abuts against the gap after extending out of the opening; and
   the support mechanism further comprises a locking sleeve; the locking sleeve is sleeved on the connector; wherein when the support member is extended out of the base and into the support state, the locking sleeve is out of the base and is configured to move towards the base until the locking sleeve reaches the base to lock a relative position of the support member and the base.

2. The support base according to claim 1, wherein the support mechanism further comprises a limiting ring; the limiting ring is sleeved on the connector and is located on one end of the connector adjacent to the support member; and the locking sleeve is configured to move longitudinally along the connector until the locking sleeve reaches the limiting ring.

3. The support base according to claim 1, wherein the connector is a connecting sleeve; one end of the connecting sleeve is sleeved outside the support member, and another end of the connecting sleeve radially extends to form a sliding part; the storage part is a sliding chute; the sliding part is slidably connected to the sliding chute; a circumferential surface of the sliding part is partially or completely an arc surface; and the sliding part is configured to rotate relative to the base when sliding to the opening, so that the connecting sleeve abuts against the gap.

4. The support base according to claim 1, wherein the base comprises a bottom plate, a cover plate opposite to the bottom plate, and a side plate connected between the bottom plate and the cover plate; the storage part is located between the bottom plate and the cover plate; the opening is located on the side plate; the storage part comprises a sliding chute located between the bottom plate and the cover plate; and the support mechanism is slidably connected to the sliding chute.

5. The support base according to claim 1, wherein an outer surface of the connector has a first thread structure; an inner surface of the locking sleeve has a second thread structure cooperating with the first thread structure; the locking sleeve is used for abutting against or being separated from the base through rotation of the first thread structure relative to the second thread structure; when the locking sleeve abuts against the base, the relative position of the support member and the base is locked; and when the locking sleeve is separated from the base, the support mechanism is capable of rotating around the base.

6. An electronic device, comprising a device main body and a support base, wherein the support base is the support base according to claim 1; the device main body is hinged to the support mechanism; and when the support mechanism is stored in the base, the device main body is superimposed on the upper surface or the lower surface of the base.

7. A selfie device, comprising a clamp main body and a support base, wherein the support base is the support base according to claim 1; the clamp main body is hinged to the support mechanism; and when the support mechanism is stored in the base, the clamp main body is superimposed on the upper surface of the base.

8. The selfie device according to claim 7, wherein the clamp main body is provided with a clamping part; a groove is formed in the upper surface of the base; and when the clamp main body is superimposed on the upper surface of the base, at least part of the clamping part is received in the groove.

* * * * *